US008935608B2

(12) United States Patent
Yoshida

(10) Patent No.: US 8,935,608 B2
(45) Date of Patent: Jan. 13, 2015

(54) INFORMATION PROCESSING METHOD AND APPARATUS

(75) Inventor: Toru Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2256 days.

(21) Appl. No.: 11/746,814

(22) Filed: May 10, 2007

(65) Prior Publication Data

US 2007/0276809 A1    Nov. 29, 2007

(30) Foreign Application Priority Data

May 24, 2006  (JP) .................................. 2006-144682

(51) Int. Cl.
*G06F 17/00*     (2006.01)
*G06F 17/30*     (2006.01)

(52) U.S. Cl.
CPC ............................. *G06F 17/30716* (2013.01)
USPC ............................ 715/273; 715/243; 715/246

(58) Field of Classification Search
CPC ..... G06Q 10/107; G06F 17/212; G06F 17/21; G06F 17/241; G06F 17/30011; G06F 17/24; G06F 17/30716
USPC ......... 715/234, 240, 243, 246, 253, 255, 271, 715/273; 707/722
See application file for complete search history.

(56) References Cited

U.S. PATENT DOCUMENTS

| | | | | |
|---|---|---|---|---|
| 5,898,836 | A * | 4/1999 | Freivald et al. | 709/218 |
| 5,978,842 | A * | 11/1999 | Noble et al. | 709/218 |
| 7,487,443 | B2 * | 2/2009 | Guido et al. | 715/246 |
| 7,567,958 | B1 * | 7/2009 | Alspector et al. | 1/1 |
| 7,627,600 | B2 * | 12/2009 | Citron et al. | 1/1 |
| 7,640,491 | B2 * | 12/2009 | Goodacre et al. | 715/234 |
| 2005/0154694 | A1 * | 7/2005 | Muller | 707/1 |
| 2007/0061711 | A1 * | 3/2007 | Bodin et al. | 715/523 |

FOREIGN PATENT DOCUMENTS

| | | |
|---|---|---|
| JP | 09-330314 A | 12/1997 |
| JP | 2002-074525 A | 3/2002 |
| JP | 2005-311938 A | 11/2005 |
| WO | 2003/083674 A1 | 10/2003 |

OTHER PUBLICATIONS

Feb. 10, 2011 Japanese Office Action, which is enclosed without an English Translation, that issued in Japanese Patent Application No. 2006-144682.

* cited by examiner

*Primary Examiner* — Adam M Queler
(74) *Attorney, Agent, or Firm* — Cowan, Liebowitz & Latman, P.C.

(57) ABSTRACT

In a layout system, assuming that container (partial region) B is set with a high priority level, and the contents of container A are changed after a previous browse timing of the user, container B is preferentially laid out irrespective of the change in contents of container A. Upon generating a digital document by inserting contents in respective containers in accordance with the definition of a document template, the unread/read state of a container or content is managed for each user. The priority level of display of the container or a container in which the content is inserted is set in accordance with the unread/read state of the container or content, and a digital document on which a plurality of containers are arranged in accordance with the priority levels is generated.

16 Claims, 49 Drawing Sheets

FIG. 19

|  | A | B | C | D | E |
|---|---|---|---|---|---|
| A | ○ | × | ○ | × | ○ |
| B | ○ | ○ | × | ○ | × |
| C | × | × | ○ | × | × |
| D | ○ | ○ | × | ○ | × |
| E | ○ | ○ | × | × | ○ |

FIG. 20

|   | A | B | C | D | E |
|---|---|---|---|---|---|
| A |   | 3 | 0 | 5 | 0 |
| B | 3 |   | 2 | 4 | 1 |
| C | 0 | 2 |   | 1 | 3 |
| D | 5 | 4 | 1 |   | 0 |
| E | 0 | 1 | 3 | 0 |   |

FIG. 22

| CONTAINER / USER | A | B | C | D | E | F | G |
|---|---|---|---|---|---|---|---|
| X | READ | READ | READ | READ | READ | READ | READ |
| Y | READ | UNREAD | READ | — | UNREAD | — | READ |
| Z | UNREAD | UNREAD | UNREAD | — | UNREAD | — | UNREAD |

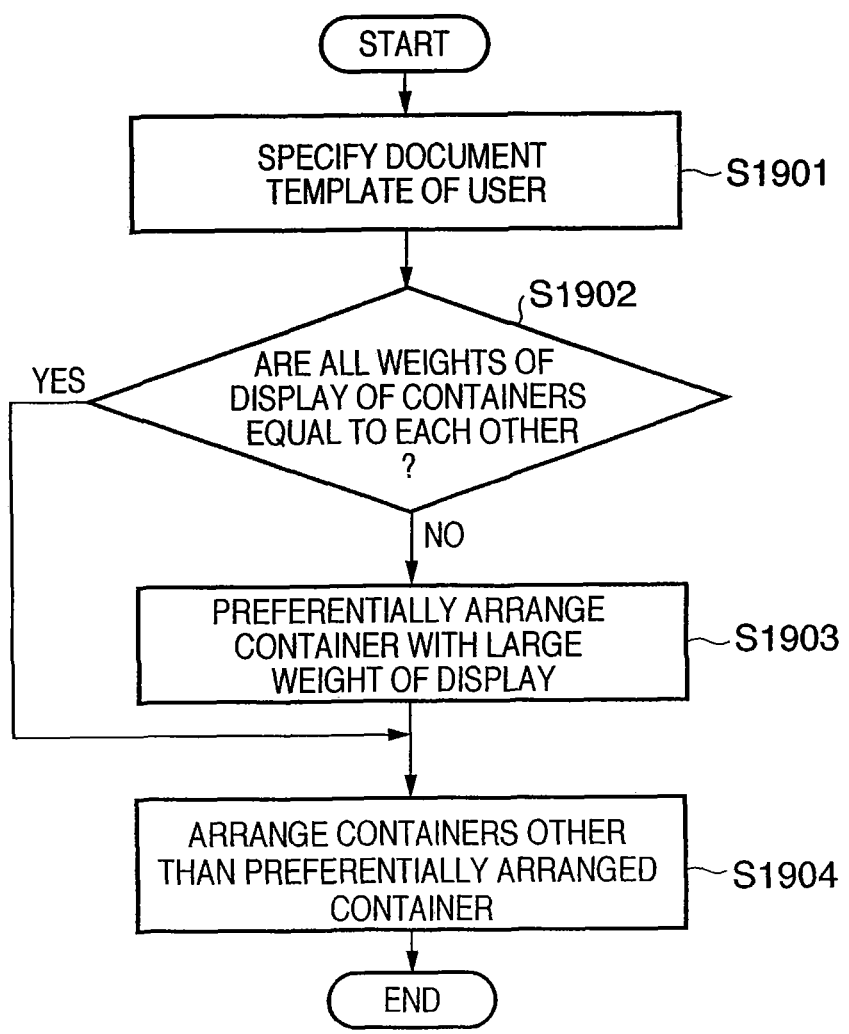

FIG. 27A

- A PATIENT NAME
- B DIAGNOSIS
- C ADDITIONAL INFORMATION

FIG. 27C

- A PATIENT NAME
- C ADDITIONAL INFORMATION
- E PRESCRIPTION
- G DOCTOR'S SIGNATURE

FIG. 27B

- A PATIENT NAME
- D MEDICATION LIST
- E PRESCRIPTION
- F REMARKS
- G DOCTOR'S SIGNATURE

FIG. 27D

- A PATIENT NAME
- B DIAGNOSIS
- G DOCTOR'S SIGNATURE

F I G. 29

| ITEM / USER | A | B | C | D | E | F | G |
|---|---|---|---|---|---|---|---|
| DOCTOR A | READ | READ | READ | READ | READ | READ | READ |
| NURSE B | READ | READ | READ | — | READ | — | READ |
| NURSE C | UNREAD | UNREAD | UNREAD | — | UNREAD | — | UNREAD |

F I G. 31

| USER \ ITEM | A | B | C | D | E | F | G |
|---|---|---|---|---|---|---|---|
| DOCTOR A | READ | READ | READ | READ | READ | READ | READ |
| NURSE B | READ | UNREAD | READ | — | UNREAD | — | READ |
| NURSE C | UNREAD | UNREAD | UNREAD | — | UNREAD | — | UNREAD |

FIG. 33

| ITEM / USER | A | B | C | D | E | F | G |
|---|---|---|---|---|---|---|---|
| DOCTOR A | READ | READ | UNREAD | READ | READ | READ | READ |
| NURSE B | READ | READ | READ | — | READ | — | READ |
| NURSE C | READ | READ | UNREAD | — | READ | — | READ |

F I G. 34

| CONTAINER / ROLE | A | B | C | D | E | F | G |
|---|---|---|---|---|---|---|---|
| 1 | 3 | 10 | 7 | 6 | 8 | 2 | 5 |
| 2 | 10 | 6 | 8 | 0 | 4 | 0 | 9 |

FIG. 35

| ROLE \ ITEM | A | B | C | D | E | F | G |
|---|---|---|---|---|---|---|---|
| DOCTOR | 3 | 10 | 7 | 6 | 8 | 2 | 5 |
| NURSE | 10 | 6 | 8 | 0 | 4 | 0 | 9 |

FIG. 36

(NURSE B BROWSES)

| A | B.B (AGE: XX) | 2005/10/XX |

(MAIN WINDOW)

B
EXHIBIT COLD SYMPTOMS

HEADACHE

FEVER: ~~38.5~~

NAUSEA

FEVER RISE TO 40.5

E
~~COMBINATION~~
~~COLD REMEDY~~

~~3 TIMES/DAY~~
~~× 1 WEEK~~

ANTIPYRETIC
× 1

| G | J.B |

| A | B.B (AGE: XX) | 2005/10/XX |

(SUB WINDOW)

C
..............

| G | J.B |

FIG. 37

| USER \ ITEM | A | B | C | D | E | F | G |
|---|---|---|---|---|---|---|---|
| DOCTOR A | READ | READ | READ | READ | READ | READ | READ |
| NURSE B | READ | READ | READ | — | UNREAD | — | READ |
| NURSE C | UNREAD | UNREAD | UNREAD | — | UNREAD | — | UNREAD |

FIG. 38

(NURSE B BROWSES)

(MAIN WINDOW)

| A | B.B (AGE: XX)    2005/10/XX |

E
~~COMBINATION~~
~~COLD REMEDY~~

~~3 TIMES/DAY~~
~~× 1 WEEK~~

ANTIPYRETIC
× 1

C
············

G  J.B (SUB WINDOW)

A  B.B (AGE: XX)    2005/10/XX

B
EXHIBIT COLD
SYMPTOMS

HEADACHE

FEVER: ~~38.5~~

NAUSEA

FEVER RISE TO 40.5

| CON-TAINER / USER | A | | B | | C | | D | | E | | F | | G | |
|---|---|---|---|---|---|---|---|---|---|---|---|---|---|---|
| | STATE | CHANGE USER | STATE | CHANGE USER | STATE | CHANGE USER | STATE | CHANGE USER | STATE | CHANGE USER | STATE | CHANGE USER | STATE | CHANGE USER |
| X | READ | — | READ | — | READ | — | READ | — | READ | — | READ | — | READ | — |
| Y | READ | — | UN-READ | × | READ | — | — | — | UN-READ | × | — | — | READ | — |
| Z | UN-READ | × | UN-READ | × | UN-READ | × | — | — | UN-READ | × | — | — | UN-READ | × |

FIG. 40

| ID | NAME | PASSWORD | ROLE | MAIL ADDRESS |
|---|---|---|---|---|
| USER X | ○○○○ | Pass1 | A | user0001@xxx.co.jp |
| USER Y | △△△△ | Pass2 | B | user0002@xxx.co.jp |
| USER Z | □□□□ | Pass3 | B | user0003@xxx.co.jp |

FIG. 42

| CON-TAINER<br>USER | A | | B | | C | | D | | E | | F | | G | |
|---|---|---|---|---|---|---|---|---|---|---|---|---|---|---|
| | STATE | CHANGE DATE AND TIME | STATE | CHANGE DATE AND TIME | STATE | CHANGE DATE AND TIME | STATE | CHANGE DATE AND TIME | STATE | CHANGE DATE AND TIME | STATE | CHANGE DATE AND TIME | STATE | CHANGE DATE AND TIME |
| X | READ | — | READ | — | READ | — | READ | — | READ | — | READ | — | READ | — |
| Y | READ | — | UN-READ | 051120 09:50:43 | READ | — | — | — | UN-READ | 051120 10:05:14 | — | — | READ | — |
| Z | UN-READ | 051120 09:45:23 | UN-READ | 051120 09:45:23 | UN-READ | 051120 09:45:23 | — | — | UN-READ | 051120 09:45:23 | — | — | UN-READ | 051120 09:45:23 |

FIG. 44

| CONTAINER / USER | A | B | C | D | E | F | G |
|---|---|---|---|---|---|---|---|
| X | NOTIFY | NOTIFY | — | — | — | — | — |
| Y | NOTIFY | — | — | — | NOTIFY | — | NOTIFY |
| Z | NOTIFY | — | — | — | NOTIFY | — | NOTIFY |

F I G. 46

| ID | CONTAINER | USER | MAIL ADDRESS |
|---|---|---|---|
| M0001 | E | Y | user0002@xxx.co.jp |
| M0002 | E | Z | user0003@xxx.co.jp |

INFORMATION PROCESSING METHOD AND APPARATUS

BACKGROUND OF THE INVENTION

1. Field of the Invention

The present invention relates to information processing which generates a digital document in which contents are inserted in a plurality of containers in accordance with the definition of a document template.

2. Description of the Related Art

In recent years, applications have diversified and gained multi-functions, and have many controls and display items. Along with the diversification and multi-functionality of applications, the number of items to be displayed increases inevitably. Conventionally, the number of display items is increased by utilizing switching by means of multi-windows and tab controls.

A system that allows a plurality of users to browse and update information managed by a server and database using their client applications has prevailed. In such system, the number of display items of the client application increases with increasing number of pieces of information managed by the server and database, thus complicating the display contents.

In case of the system which allows the user to browse and update information managed by the server and database using an application having many display items, it is difficult for the user to discriminate changed portions from the previous browse/update timing until the current browse/update timing. This is because the user must check all the many display items to discriminate the changed portions. In addition, the user must switch the display items by means of multi-windows and tab controls, and cannot check all the display items unless he or she makes a plurality of times of operations. As a result, even when given information has gone through an important change, the user may not notice that change.

A method of presenting changed portions by changing the text color of the changed portions, making pointed display of the changed portion, or the like has been proposed. This method assumes presentation of changed portions applied to data managed by a server and database, and does not present, to the user, changed portions from the previous browse/update timing until the current browse/update timing of the user.

Also, an automatic layout system which prepares a plurality of containers in a limited region, inserts data from a database into containers, and dynamically arranges the containers is known. The automatic layout system can variably set the container size of the inserted text and image. However, the layout system is a system for inserting predetermined data into a predetermined container, and displaying the data, and cannot automatically lay out data changed portions desired by the user in a form easy to understand for his or her.

For example, assume that there is a database which stores an infinite number of data, and containers A and B whose size is variable (to be referred to as "variable containers" hereinafter) are created. In this state, data are inserted in variable containers A and B and are displayed. When both the data to be inserted into variable containers A and B are large and cannot fall within a window, the sizes of the data to be inserted into variable containers A and B are made equal or these data are displayed to fall within the window in a predetermined priority order.

The priority order means a permissible amount of a size change amount which is decided in advance for each variable container. When permissible amounts are set for respective variable containers, a variable container with a large permissible amount is displayed in a size close to the set size as much as possible, and a variable container with a small permissible amount need not have a size close to the set size.

Such layout system suffers the following problems. For example, assume that the high priority order is set in container B, and the contents of container A have changed from the previous browse timing of the user. In this case, the layout is made based on the priority order irrespective of the change in contents of container A. As a result, the display size of container A with the low priority order is too small to display the changed portion, and the user may not notice the change in contents.

SUMMARY OF THE INVENTION

In one aspect, an information processing method of generating a digital document by inserting contents into partial regions in accordance with a definition of a document template comprises managing an unread/read state of a partial region or a content for each user, setting a priority level of display of the partial region of interest or a partial region, in which the content of interest is inserted, in accordance with the unread/read state of the partial region or the content, and generating a digital document, on which a plurality of partial regions are arranged, in accordance with the priority levels.

In another aspect, an information processing method comprises managing browse information of contents data for each user, inputting user information, and preferentially arranging, when it is determined based on the user information and the browse information that contents data to be inserted in a partial region is unread, the partial region in which the contents data is inserted.

According to these aspects, a digital document which allows the user to easily recognize a change in contents of a container can be generated.

Further features of the present invention will become apparent from the following description of exemplary embodiments with reference to the attached drawings.

BRIEF DESCRIPTION OF THE DRAWINGS

FIG. 19 shows a registration example of a correlation table;

FIG. 20 shows display/non-display flags of containers and their correlations;

FIG. 22 shows an example of an unread/read management table of respective containers for respective users;

FIG. 24 is a flowchart showing the arrangement of containers in consideration of their weights;

FIGS. 27A to 27D show examples of electronic medical chart templates for a doctor and nurse;

FIG. 29 shows an unread/read management table;

FIG. 31 shows an unread/read management table;

FIG. 33 shows an unread/read management table;

FIG. 34 is a view for explaining an importance level management table;

FIG. 35 shows an example of the importance level management table;

FIG. 36 shows an example of the main window and sub window when the doctor updates the contents the electronic medical chart and, after that, the nurse browses it;

FIG. 37 shows an unread/read management table;

FIG. 38 shows the windows displayed by re-calculating the layout;

FIG. 39 shows a state change management table;

FIG. 40 shows a user information table;

FIG. 42 shows a state change management table;

FIG. 44 shows a change notification management table;

FIG. 46 shows an example of an ID information table;

DESCRIPTION OF THE EMBODIMENTS

An information processing according to preferred embodiments of the present invention will be described hereinafter with reference to the accompanying drawings.

First Embodiment

Layout System

System Arrangement

Figure 1:
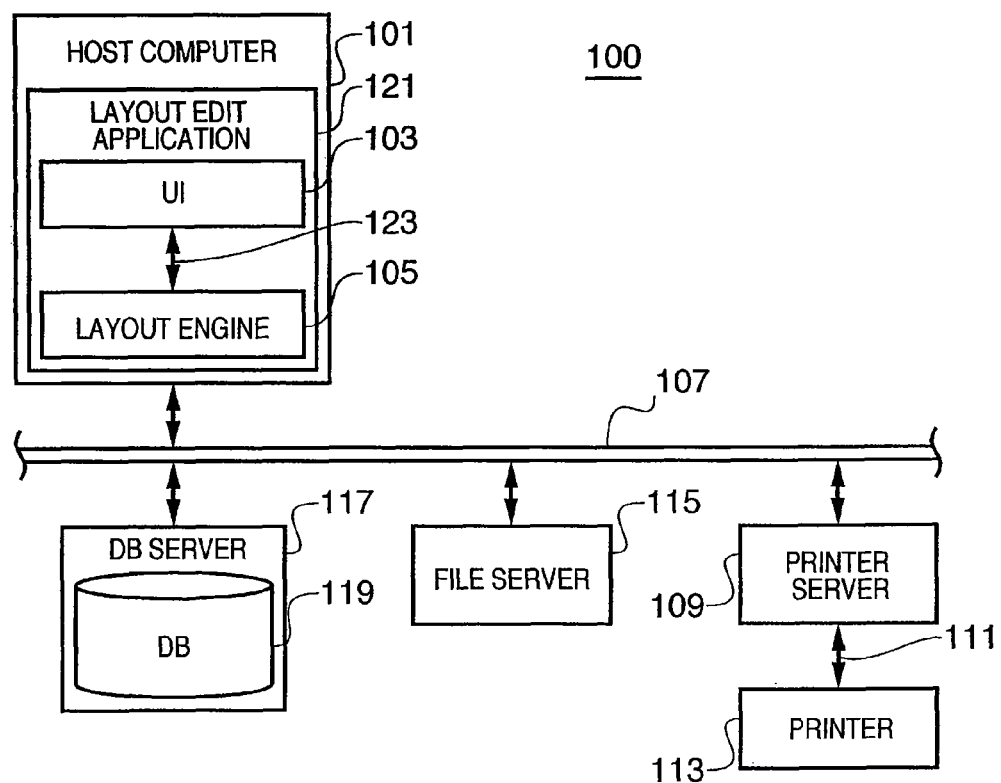
FIG. 1 is a block diagram showing the arrangement of an information processing system which provides a layout system.

FIG. 1 is a block diagram showing the arrangement of an information processing system 100 which provides a layout system.

A layout edit application 121 which runs on a host computer 101 includes a user interface (UI) 103 and layout engine 105 as software components. The UI 103 provides display to the user, and also a mechanism that associates data in a database (DB) 119 managed by a database (DB) server 117 with data sources. The layout engine 105 calculates the positions of rectangles and lines based on limitations and sizes given as a rectangle range, as will be described in detail later. Note that the UI 103 and layout engine 105 communicate with each other via a communication channel 123.

The host computer 101 communicates with the DB server 117, a file server 115, a printer server 109, and the like via a network 107.

Figure 2:
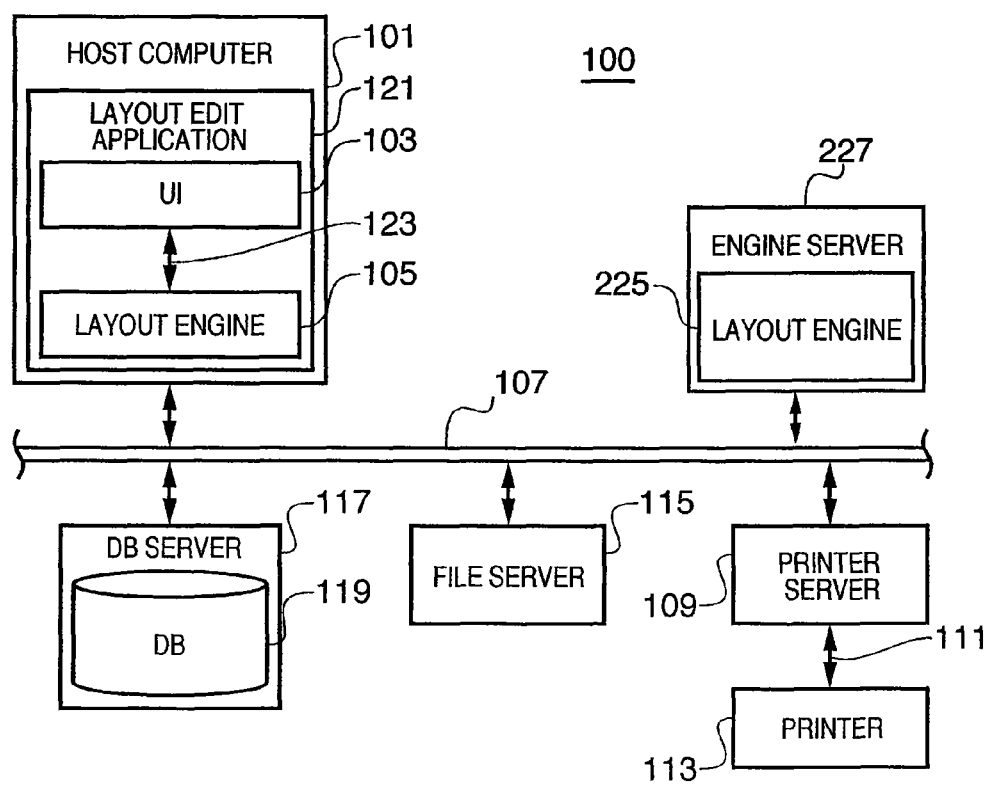
FIG. 2 is a block diagram showing the arrangement in which an engine server is located on a network.

FIG. 2 is a block diagram showing the arrangement in which an engine server 227 is located on the network 107. A layout engine 225 has the same function as that of the layout engine 105.

The layout engine 225 of the engine server 227 communicates with the layout engine 105 of the host computer 101, executes the above calculations for the layout engine 105, and returns the calculation result to the layout engine 105. With this arrangement, the engine server 227 compensates for the calculation performance of the host computer 101, thus speeding up the layout edit processing.

Figure 3:
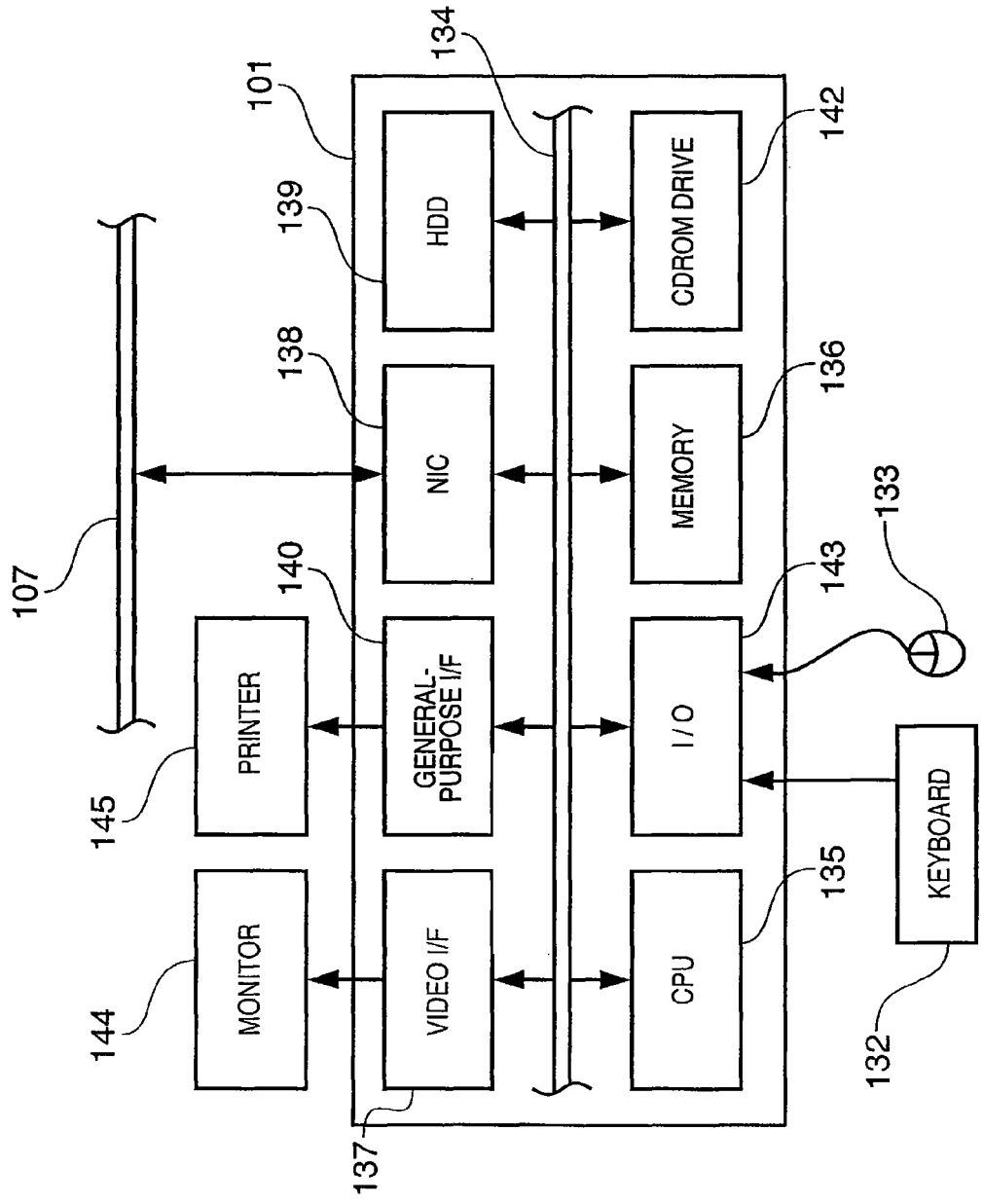
FIG. 3 is a block diagram showing the arrangement of a host computer.

FIG. 3 is a block diagram showing the arrangement of the host computer 101.

A CPU 135 of the host computer 101 executes all or some processes of software such as the layout edit application 121. Especially, display processing that naturally takes place upon layout edit is implemented when the CPU 135 controls components to be described below via a system bus 134.

A hard disk drive (HDD) 139 and a ROM of a memory 136 store software such as an operating system (OS), the layout edit application 121, and the like.

The CPU 135 inputs user instructions via a keyboard 132 and a pointing device 133 connected to an I/O 143. The CPU 135 loads programs and data stored in the HDD 139, a CDROM inserted in a CDROM drive 142, or the like onto a RAM of the memory 136 in accordance with the user instructions. The CPU 135 accesses the file server 115 connected to the network 107 via an NIC 138, and downloads programs and data provided by the file server 115. The CPU 135 executes programs to process data, and displays the processes and results on a monitor 144 connected to a video interface (I/F) 137. The CPU 135 then outputs the program execution result and data processing result in accordance with a user instruction.

The outputs of the program execution result and data processing result include storage in the HDD 139, uploading to the DB server 117 or file server 115 connected to the network 107 via the NIC 138, and the like. Alternatively, such outputs may include printing by means of a local printer 145 connected to a general-purpose I/F 140 such as USB (Universal Serial Bus) or the like. Of course, a printer 113 connected to the network 107 can be utilized in printing via the NIC 138.

User Interface

Figure 4:
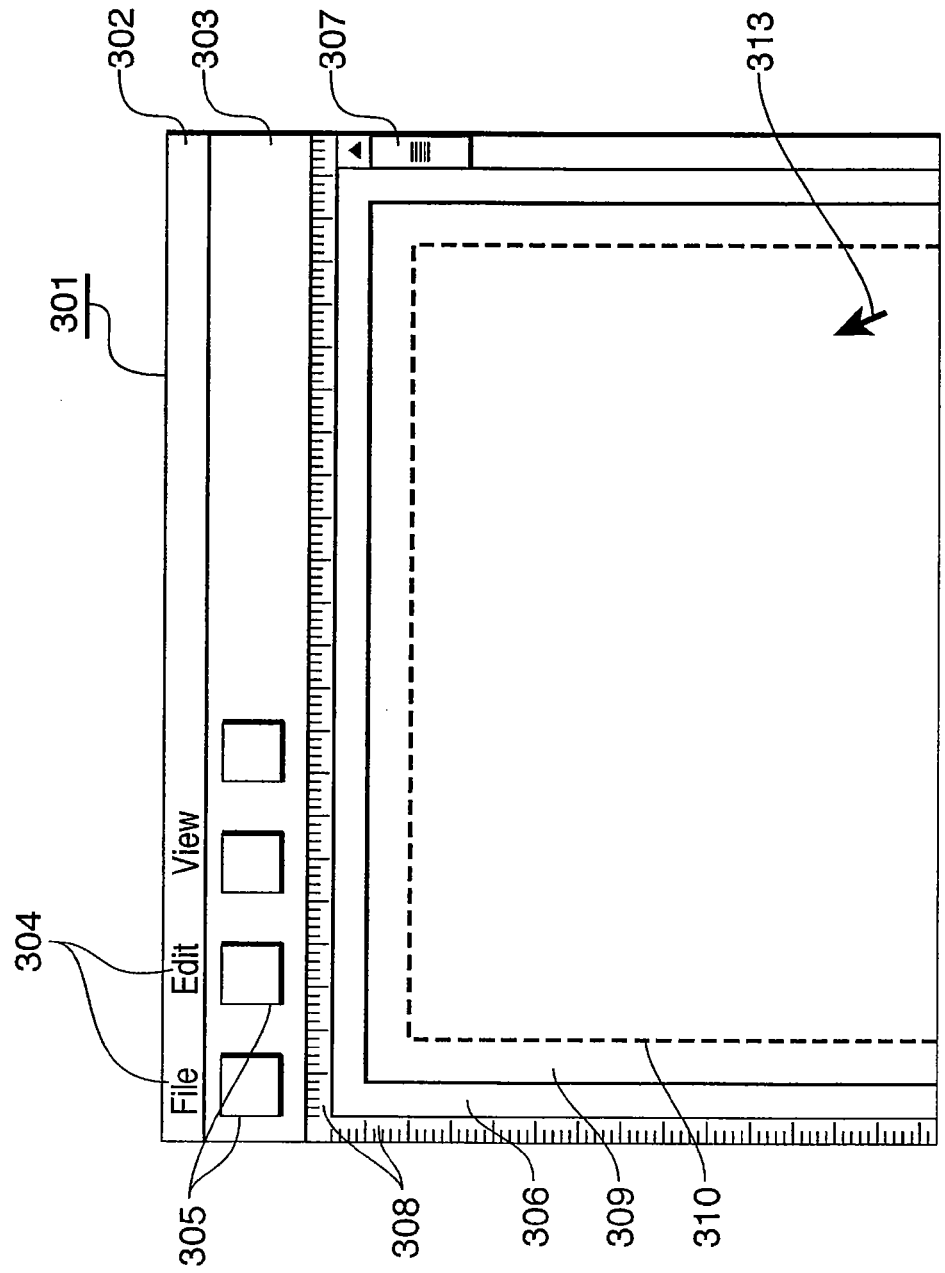
FIG. 4 shows a window provided by a user interface.

FIG. 4 shows a window 301 provided by the UI 103. Note that the monitor 144 displays the window 301.

The window 301 comprises a menu bar 302 whose display can be enabled/disabled. Also, the window 301 comprises a floating tool bar 303 which moves to and can be set at an arbitrary position on the screen of the monitor 144, and a work area 306 also in a floating state.

When the user clicks one of menu items 304 on the menu bar 302, a drop-down menu is hierarchically displayed. The tool bar 303 has many tool buttons 305 and widgets whose display can be enabled/disabled by, e.g., an environmental setting menu of a file menu.

In the work area 306, a cursor pointer 313 is displayed. A ruler 308 whose display can be enabled/disabled is used to indicate the positions of the pointer 313, a document template 309, a line, a margin guide 310, and containers or objects. The work area 306 can scroll by a scroll guide 307.

Figure 5:
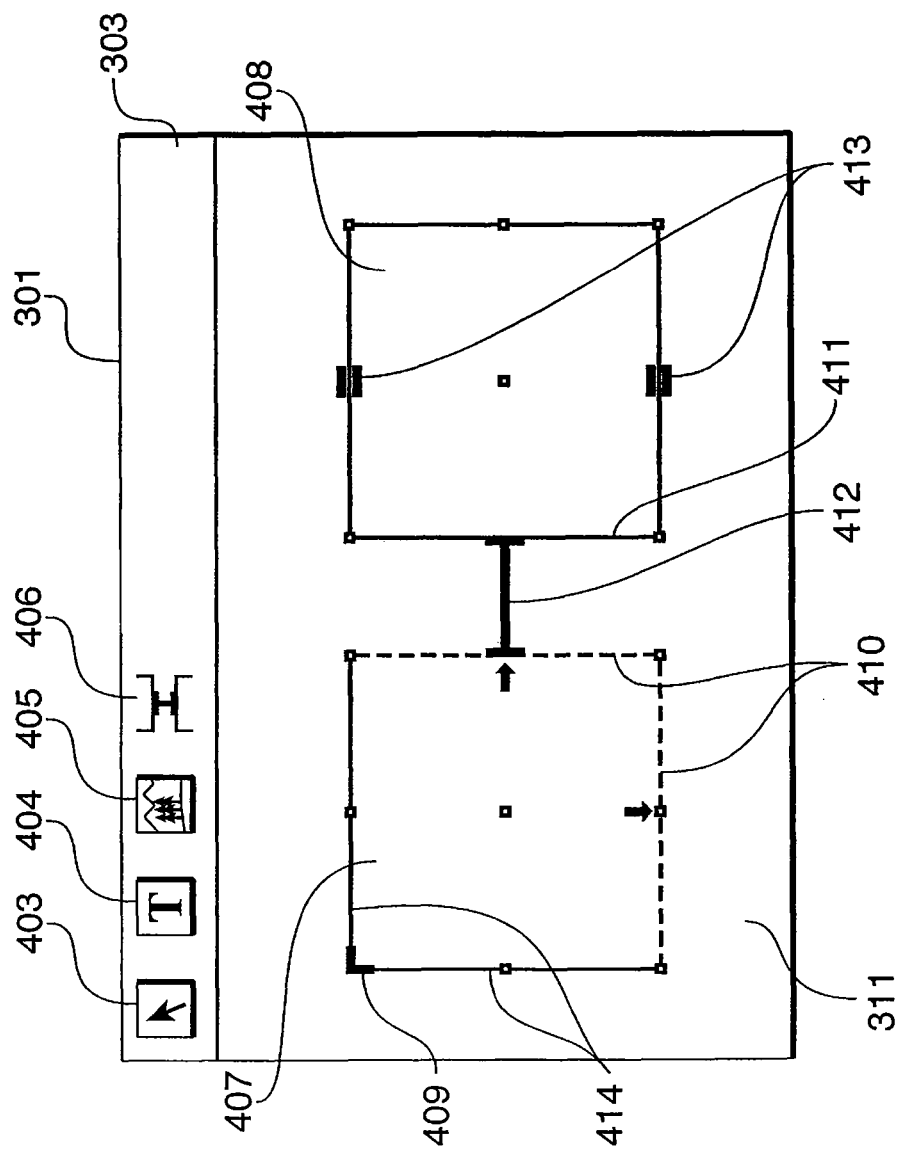
FIG. 5 shows representative buttons which can be displayed on a tool bar.

FIG. 5 shows the representative buttons which can be displayed on the tool bar 303.

A selection tool button 403 is used to select, move, and change the size of a side of a container, and to lock and unlock it. The button 403 allows to select a plurality of containers by dragging a selection box around containers or selecting containers while holding down, e.g., a CTRL key on the keyboard 132.

An image container tool button 405 is used to create a container having a static or variable image. A text container tool button 404 is used to create a container having static or variable text. A link tool button 406 is used to create a link for controlling the distance between containers.

These buttons are implemented on the UI 103 as tool tips of icons which change according to the operation conditions.

Document Template

The work area 306 is used to display and edit the design of a document template. The user designs a display overview of a document in a preparation stage to understand how the merged document changes based on the volumes and sizes of variable data.

If an external data source has a link to a template, variable text and images are displayed in these containers to allow the user to preview the current document.

The document structure and a visual clue upon rendering a container of variable data are always displayed when the pointer 313 is moved onto the container or when the container is selected.

The page size of the document template is designated by the window size. The actual number of pages of each document may change depending on variable data. If variable data cannot be fit into one page, an additional page is automatically generated.

A boundary line (margin guide 310) in each page indicates a maximum displayable region of an object on a page.

FIG. 5 also shows an example of objects set on the document template 311. Containers 407 and 408 have sides 414 which are fixed by an anchor icon 409 that can be set at an arbitrary position, unfixed sides 410, a link 412 which links the side 410 and a side 411, and sliders 413.

Container (Partial Region)

A container is a space having static or variable text or a static or variable image in the document template, and is laid out together with another container and object. The container can be moved, resized, and re-created using the cursor pointer 313. More properly, the container has a set of settings, visual expression, interaction, and edit operation. The container is defined as follows.

The container (partial region) has a static or variable content. A variable content is dynamic in the sense that it is brought from a data source and may be displayed differently in different documents. A static content is displayed in the same way in all documents generated using the container. However, the static content may have different positions in respective documents due to the operation of the variable container.

The container has a modification function of text settings such as a background color, border, font, style, and the like to be applied to a content.

The container is merged with data from a data source upon generation of a document. The modification function is visible on display like every static contents. The variable content allows display of specific data from a data source. This expression of the container can be attained, e.g., when it is printed, when it is displayed on the monitor 144, or by both the methods.

The container has a user interface. For example, the container has an interactive graphical user interface (GUI) used to, e.g., edit the container and to make its display settings. Elements of the interface are displayed on the monitor 144 but they are not displayed upon displaying a document and are not printed upon printing the document. The UI 103 displays some modification functions of the container such as a background color and font, and adds a function required to permit to edit or display the settings of the container. A special function of the UI 103 includes, for example, a corner icon which is used to interactively change and display the size and position of the border or container. Furthermore, the special function includes a number, line, icon, and text which are overwritten to indicate the operation of the container when the container is merged with data from a data source.

Limitations on Container

The container has limitations to control how to link contents displayed by respective documents. These limitations (link static and variable contents with containers and) are the principal method of allowing the user to control generation of a large number of documents from a single document template. An example of the limitations is that "the height of a content of this container has a maximum value of 4 inches." Another example of the limitations is that "the left ends of contents of the containers must be displayed an identical horizontal position in respective documents." The contents described here are various methods for displaying and editing such limitations.

The user can designate the sizes and positions of contents of documents using the containers. Some document is generated from one document template. Therefore, the UI is necessary to designate and display many possibilities and limitations.

The sides of one container define virtual boundary lines within which associated contents are displayed in documents. Discussing about the left side of the container amounts to discussing about the displayable leftmost sides of the associated contents in every documents. Likewise, discussing about the height of the container amounts to discussing about the limitation on the heights of the content associated with created documents. The above differences will be clarified below upon discussing the sides or the size of the container with reference to the UI 103.

Term "fixed" used to define some values to limit display of the content is common to all documents.

If the width of the container is fixed, the same widths are assigned to the associated contents in all documents. If the height of the container is fixed, the same heights are assigned to the associated contents in all documents.

If the limitation on the distance is fixed, the designated distance is a limitation for all documents. If the right and left sides of the container are fixed, the horizontal positions of the sides are the same in a page for all documents. However, the height or vertical position of the container is variable. For example, if the left side of the container is fixed, the associated contents may be displayed near the top of a page in one document, or may be displayed near the bottom of a page in another document. However, the left sides have the same horizontal position in all cases.

If the top and bottom sides of the container are fixed, the height and the vertical positions of the sides of containers are the same in a page for all documents. However, the width and horizontal position of the containers are variable.

The vertical axis of the container is an imaginary vertical line located between the parallel right and left sides of the container. If the vertical axis of the container is fixed, the averages of the horizontal positions of the right and left sides of containers are the same in all documents. With this limitation, the width of the container can change. In a document having different right and left sides, the right and left sides may be far from or near the vertical axis, but the vertical axes are located at the same horizontal position in all documents. However, the height and horizontal position of the container are not influenced by this limitation.

Likewise, if the horizontal axis is fixed, it limits the vertical positions of the top and bottom sides of the container, but the height of the container is not influenced by this limitation.

On the other hand, if both the horizontal and vertical axes are fixed, this means that the central position of each container is fixed. However, the width and height of the container are not influenced by this limitation.

If a corner of the container, the middle position between the sides of the container, or the central position of the container is fixed, contents are displayed at the same positions in all documents and at the same positions associated with containers. For example, if the upper left corner of the container is fixed, the upper left positions of laid-out containers are the same in all documents.

The vertical side or axis is fixed in terms of the right or left side, right or left margin, or another horizontal position of a page. Likewise, the horizontal side or axis is fixed in terms of the top or bottom side or margin, or another vertical position of a page. Term "fixed" is important only when documents have different page sizes, since documents have no difference if all documents have the same page size.

Antonym "variable" of term "fixed" means that limitations on the side, axis, corner, middle position, or document may change among documents. However, a document specific setting may not require this. For example, there are other external limitations such as actual preferred positions of sides due to change. If no external limitations are applied, since the sides are labeled as "unfixed," the positions of the sides can be changed.

Display and Edit Container
Create New Container

There are two types of containers, i.e., a text container and image container. The text container has text and an embedded image. The image container has an image alone.

A new container is created by clicking the text container tool button 404 or image container tool button 405 in FIG. 5, and dragging a rectangle on the document template 311. As another method, a new container can be created by activating the text container tool button 404 or image container tool button 405 by clicking, and then clicking an arbitrary position on the document template 311.

A dialog box or another prompt used to insert a container of a default size or to set the size of a new container is displayed. Some containers are dynamically created by a schema which is defined or calculated in advance, and are laid out.

Display Container

The state of the set container is preferably rendered by a graphical expression. The states of some sides may be fewer than graphic display since some conditions are independently expressed.

FIGS. 6A to 6D are views showing examples of exemplary side rules of a container.

The layout edit application 121 draws the sides of a container using solid lines 503 or broken lines 504 to express the states of the sides. The container has icons of anchors 506, 507, and 509, handles 502, and sliders (denoted by reference numeral 413 in FIG. 5), extend/shrink icons 505, and a color. Note that each handle 502 is a control point used to move or modify the side.

The container display rules in FIGS. 6A to 6D are as follows:

(1) A fixed side is rendered by a solid line, and an anchor 509 is rendered near its center.

(2) For a container with a fixed width, the right and left sides are rendered by solid lines.

(3) For a container with a fixed height, the top and bottom sides are rendered by solid lines.

(4) No axis is rendered.

(5) A side which is not rendered is rendered by a broken line, and an extend/shrink icon 505 is rendered near it.

(6) If crossing sides (or axes) are fixed, an anchor 506 (or 507) is rendered at their intersection.

(7) If no anchor 509 is rendered in case of the fixed side, a slider 413 is rendered near the center of that side.

(8) If neither an anchor nor slider are rendered for the crossing sides (or aces), a handle 502 is rendered at their intersection.

Lines guaranteed by rules 1 to 3 are rendered using broken lines if they are fixed or limited. A variable side guaranteed by rule 5 is rendered by a broken line. Anchors 506 (or 507) are displayed for fixed sides guaranteed by rules 6 to 8, sliders 413 are displayed for some fixed sides, and handles 502 are displayed for some other fixed sides.

In the above description, a side must be rendered only once. Once a given rule is applied to the side to be rendered, that rule is never applied to the same side again later. For example, if a container is too small and icons overlap each other, or it makes other display functions indistinct, simpler icons may be displayed, or display of the icons may be omitted.

The rendering position of the variable side depends on the content of a container. As will be described later, "dynamic calibration processing" which means that the content is merged with the document template and is visualized by the UI 103 is used. Alternative means that decides whether the contents areas or variable sides of containers which are averaged in all documents are to be laid out on the UI 103 may be used.

These content expressions provide graphical means that displays the states of the sides of a container. The expressions can be interpreted as follows.

The broken lines 410 shown in FIG. 5 depend on the content in a container, and mean the positions of the sides in a document.

The solid lines mean the limited sides. This is because the sides 414 in FIG. 5 or the width or height of the container is fixed. Note that the width and height of the container 408 in FIG. 5 are fixed.

An anchor means that the intersection of the sides or axes is fixed. Therefore, anchor points appear at horizontal and vertical positions of all documents. Obviously, the anchor is fixed. The anchor icon 409 shown in FIG. 5 is an example of an anchor which means that the crossing sides 414 are fixed.

A slider means that the corresponding side is fixed. The position of a container is decided by the "length of the slider" along the side. For example, the sliders 413 shown in FIG. 5 mean that the content of the container 408 may be displayed at the left or right side of a position expressed by a specific diagram in a document.

Some or all of these icons and sides may or may not be rendered depending on the selected tool or container to be highlighted or activated. In general, since the sides and icons of a container are used to help design the document template, they are not displayed when the content is displayed.

Settings of the minimum or maximum values of the width and height of a container are displayed on a subsidiary dialog window.

Figure 6A:
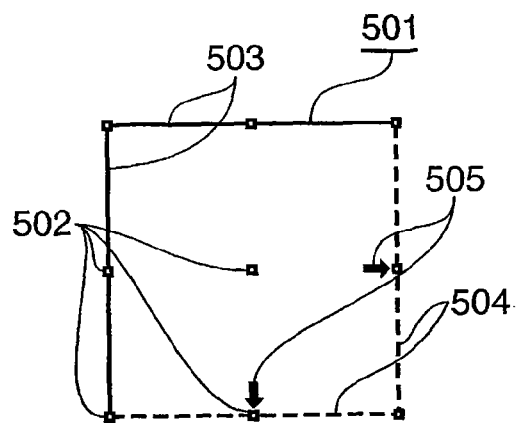
FIGS. 6A to 6D are views showing examples of exemplary side rules of a container.

In a container 501 shown in FIG. 6A, both the width and height are variable, fixed sides 503 are expressed by the solid lines, and variable sides 504 are expressed by the broken lines. Extend/shrink icons 505 indicate that the neighboring sides 504 are variable.

Figure 6B:
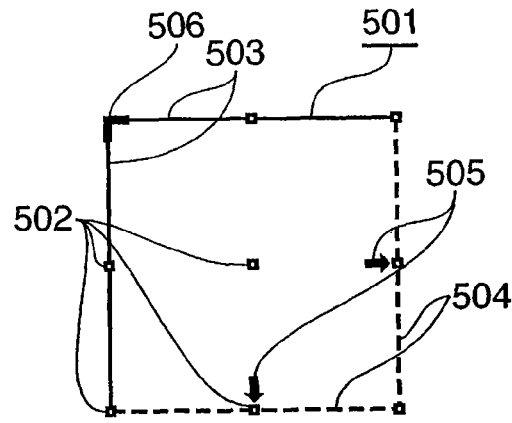

In a container 501 shown in FIG. 6B, both the width and height are variable. An anchor 506 indicates that the intersection of sides 503 is fixed.

Figure 6C:
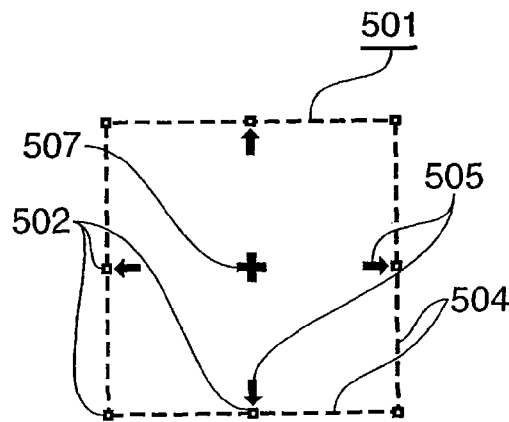

In a container 501 shown in FIG. 6C, both the width and height are variable. An anchor 507 and extend/shrink icons 505 indicate that the container can be arbitrarily extended or shrunk from the center of the container 501.

Figure 6D:
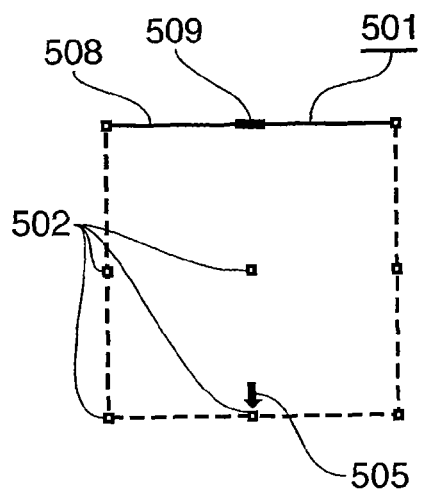

In a container 501 shown in FIG. 6D, both the width and height are variable except that a top side 508 is fixed. An anchor 509 located near the center of the top side 508 indicates that the top side 508 is fixed. An extend/shrink icon 505 indicates that the container can be extended or shrunk in the vertical direction by moving the bottom side.

Link

A link indicates an association between containers. The association indicates the distance between the containers, and the layouts of the containers associated by the link are calculated while they are influenced by each other's layout changes. A link 412 shown in FIG. 5 associates the containers 407 and 408 with each other. The link setting method and the calculation method of the layouts of the containers associated by the link will be described later.

Set Link

Figure 7:
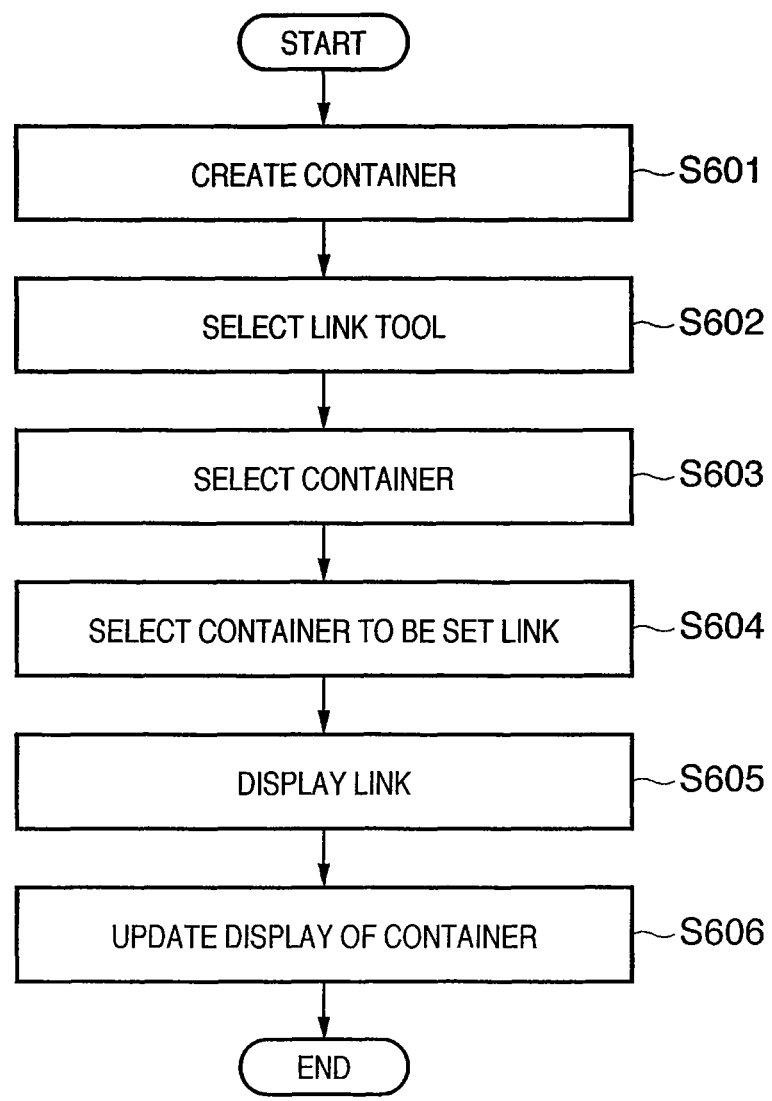
FIG. 7 is a flowchart showing a link setting method.
Figure 8:
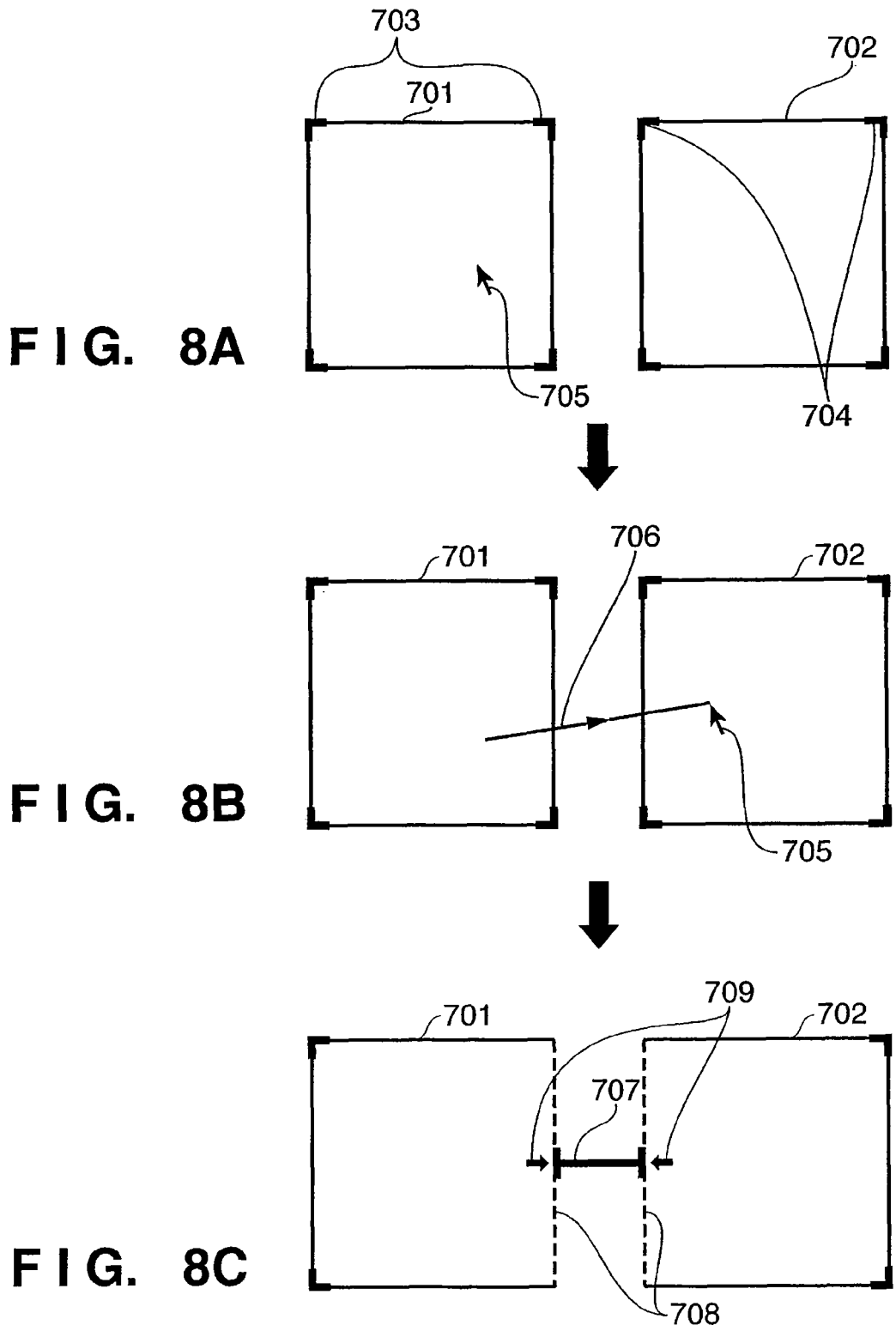
FIGS. 8A to 8C are views showing display examples of a UI.

FIG. 7 is a flowchart showing the link setting method, and the layout edit application 121 provides this processing to the user. FIGS. 8A to 8C show display examples of the UI 103. The method of setting a link to containers will be described below using these drawings.

Upon setting a link, the user creates at least two containers to which a link is to be set (S601). The user clicks the link tool button 406 to make it active (S602).

Sides 701 and 702 are fixed by anchors 703 and 704. The user moves a cursor pointer 705 to one container to which a link is to be set and clicks it to select that container (S603).

As shown in FIG. 8B, the user moves the cursor pointer 705 to the other container, and clicks it (S604). A line 706 shown in FIG. 8B is a straight line which connects the click position in FIG. 8A and the position after movement of the cursor pointer 705, and is a user interface indicating the position where the link is set.

After step S604, a link 707 is displayed (S605), as shown in FIG. 8C. Upon setting the link 707, display of the containers is automatically changed (S606).

Sides 708 indicated by the broken lines in FIG. 8C are variable sides, as described above. The reason why the states of the sides of the containers change in this way is that the sides of the containers must be set to be variable as a result of the setting of the link 707. This processing is automatically done to avoid inconsistency that all the sides are fixed although the link is set.

Extend/shrink icons 709 shown in FIG. 8C are marks which visually show the user the directions in which the containers can be changed upon setting of the link. In the example of FIG. 8C, the right side of the left container 701 and the left side of the right container 702 become variable. However, this is merely an example, and the right container 702 may change to a setting having sliders 413 shown in FIG. 5.

Layout Calculation

The layout edit application 121 comprises a layout mode for creating containers, associating the containers with each other, and creating a layout. Also, the layout edit application 121 comprises a preview mode for inserting the contents of records into the created layout, and previewing the layout result after the contents are actually inserted. When the user selects the preview mode, the layout edit application 121 inserts the contents of actual records and calculates a layout. Note that the preview mode is a layout calculation on display. Upon printing, the contents are inserted, and a layout corresponding to a recording paper size is calculated. In this case, the same calculation method is used. Note that a record is a unit of information recorded in the DB 119 shown in FIG. 1.

Figure 9:
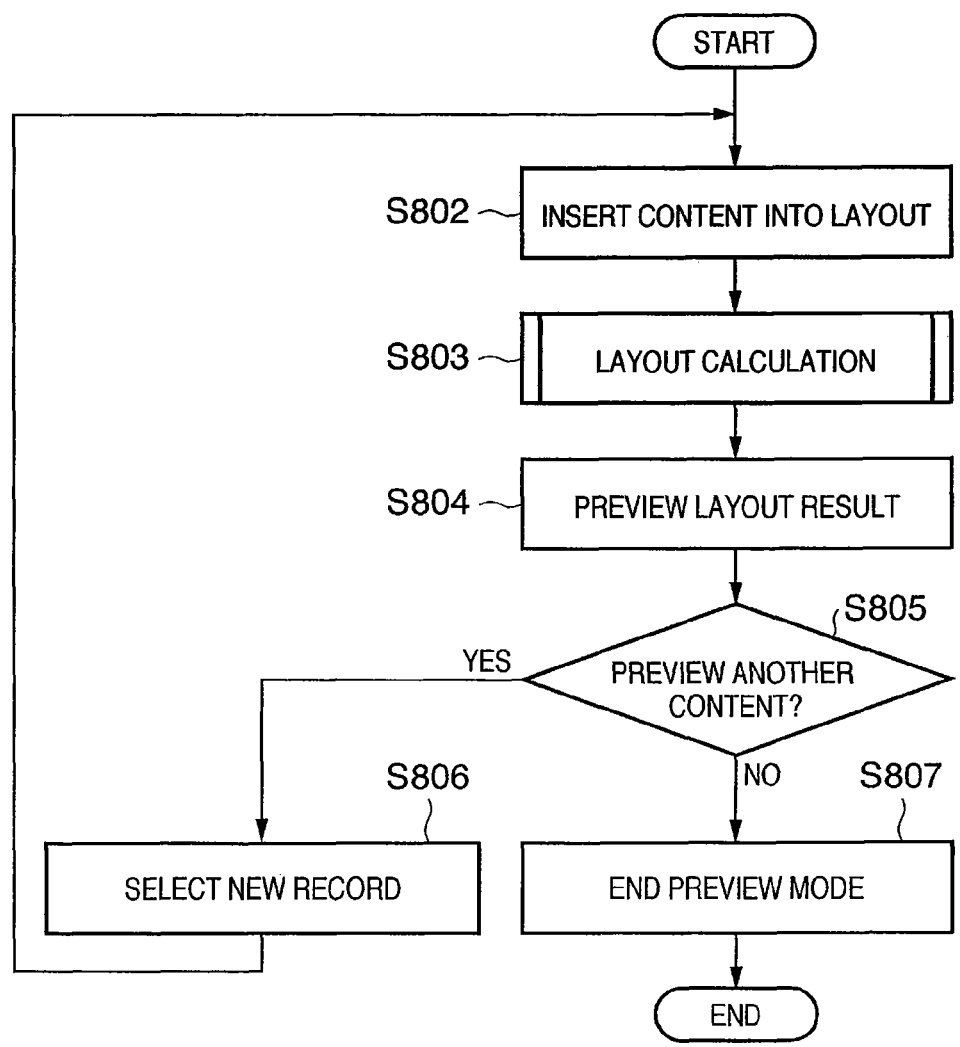
FIG. 9 is a flowchart of a layout calculation.

FIG. 9 is a flowchart of a layout calculation, and the layout edit application 121 executes this processing when the user selects the preview mode.

The content of a record to be previewed is selected and is inserted into a layout (S802), and the layout is calculated (S803). The calculated layout is displayed (S804). The user is asked whether he or she wants to preview another record (S805) If the user decides not to preview another record, the preview mode ends (S807).

If the user decides to preview another record, the other record is selected (S806) to select its content and to insert it into a layout (S802). The layout is calculated again (S803), and the calculation result is previewed (S804).

Note that print processing calculates layouts in turn for all contents to be printed. Hence, the print processing does not include any processes in steps S805 and S807. Upon completion of printing of all the contents, the print processing ends.

Layout Calculation Method

Figure 10:
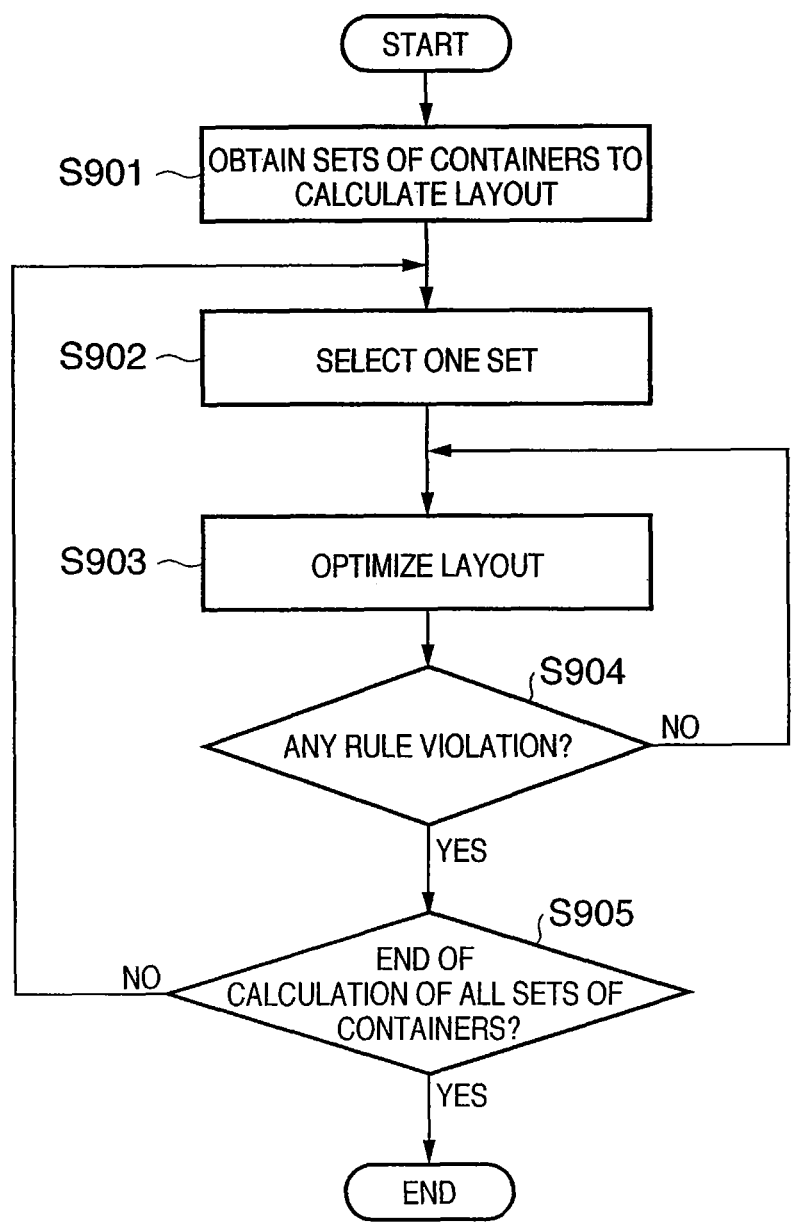
FIG. 10 is a flowchart showing details of the layout calculation.

FIG. 10 is a flowchart showing details of the layout calculation (S803).

Set of containers, the layout of which is to be calculated are obtained (S901). The layout calculation is made for the associated containers as one set.

Figure 11:
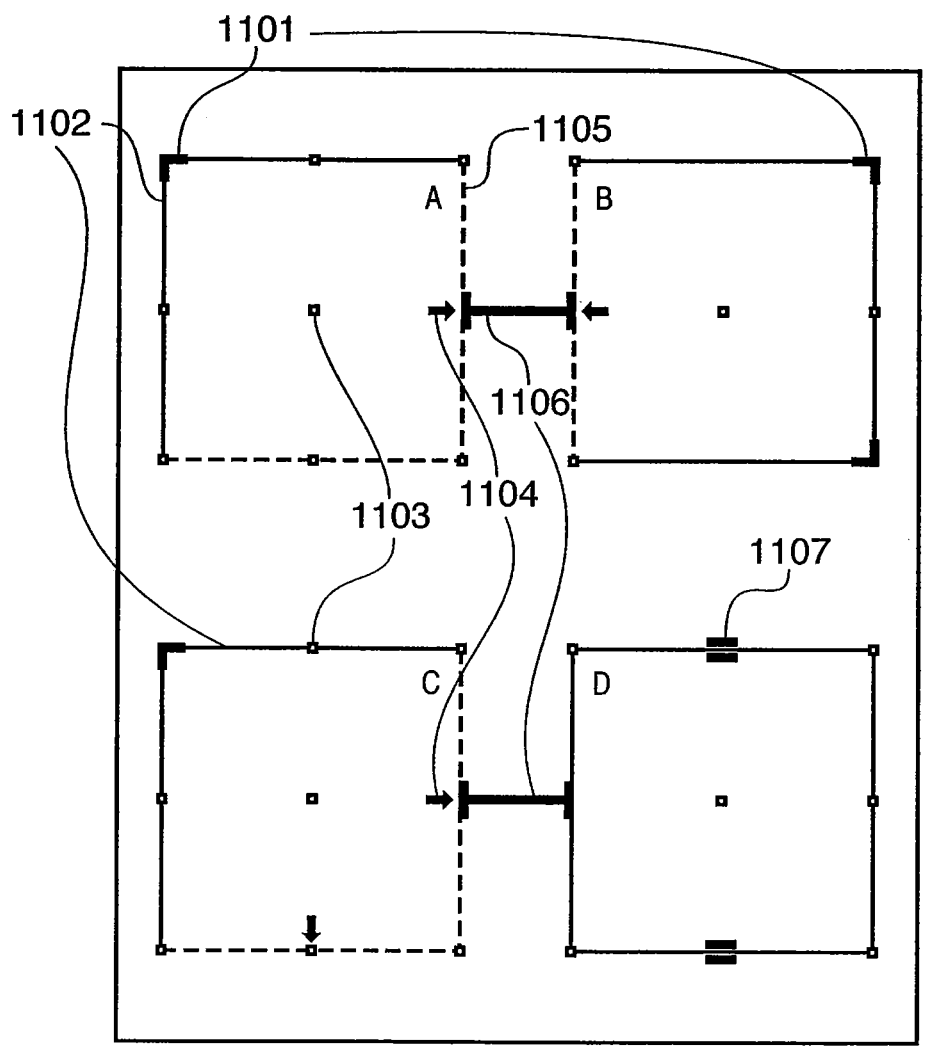
FIG. 11 shows an example of four containers laid out on a page.

FIG. 11 shows an example in which four containers are laid out on a page. The containers shown in FIG. 11 are associated with each other, and containers A and B, and containers C and D are associated by links 1106. In this case, containers A and B form set 1, and containers C and D form set 2. As described above, reference numeral 1101 denotes anchors; 1102, fixed sides; 1103, handles; 1104, extend/shrink icons; 1105, variable sides; and 1107, sliders.

One set is selected from the obtained sets of containers so as to calculate a layout (S902), and the layout of the selected set is calculated. The layout is optimized to minimize the differences between the sizes of the containers to be laid out and those of actual contents (S903). The optimization of the layout is done so that the differences between the sizes of contents respectively inserted into the associated containers to allow a dynamic change in size and those of the containers to be laid out are possibly equal to each other between the containers. After optimization of the layout, rule violations are checked (S904). If any rule violations are found, the layout is calculated again to correct the rule violations (S904). The rules are limitations which are set by the user upon creation of a layout, and include the sizes and positions of containers, the length of a link, and the like. If the layout free from any rule violations is calculated, the layout of that set is completed. The processes in steps S902 to S904 are executed for all the sets on the page based on the checking result in step S905, thus deciding the layout on the entire page.

Figure 12A:
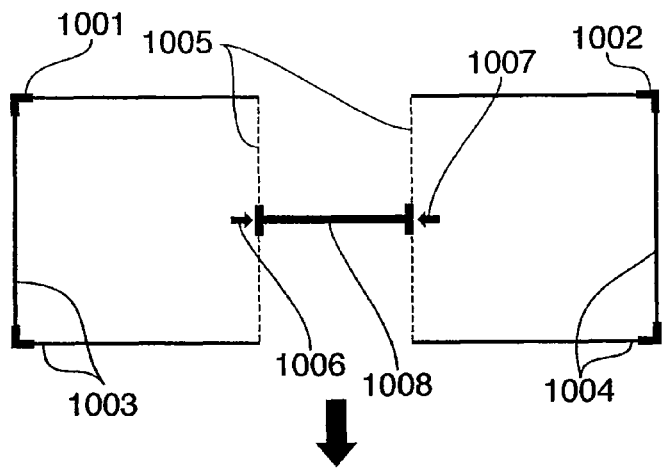
FIGS. 12A to 12C are views showing display examples of a UI upon layout calculation.
Figure 12B:
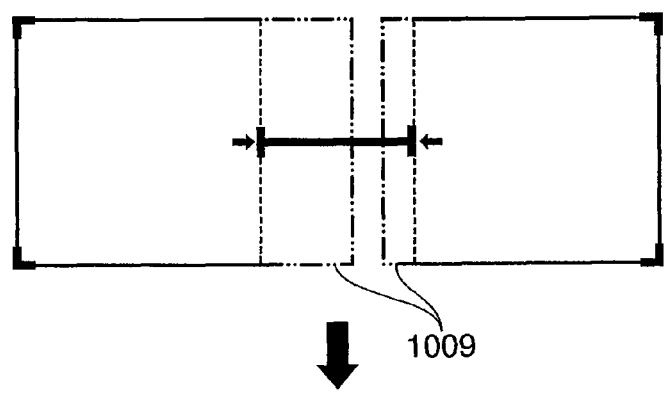
Figure 12C:
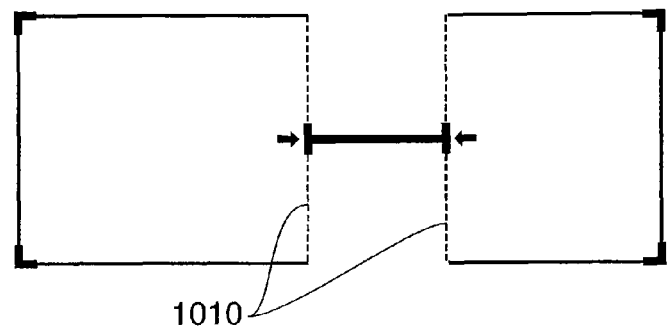

FIGS. 12A to 12C show display examples of the UI 103 upon layout calculation.

FIG. 12A shows a state in which given contents are inserted to decide a layout. Reference numerals 1001 and 1002 denote anchors; 1003 and 1004, fixed sides; 1005, variable sides; 1006 and 1007, extend/shrink icons; and 1008, a link. In this state, the contents are changed to insert contents with different sizes.

FIG. 12B shows a state in which other contents are overlaid on the layout state of FIG. 12A. Reference numeral 1009 denotes the sizes of contents to be inserted into the respective containers.

FIG. 12C shows the calculation result of the layout. The sizes of the containers after calculation are calculated to have a difference equivalent to that between the sizes of the contents to be actually inserted and to be free from any rule violations. The content sizes 1009 to be inserted shown in FIG. 12B and content sizes 1010 after calculation shown in FIG. 12C have equivalent differences in the respective containers.

Set Variable Link

Figure 13:
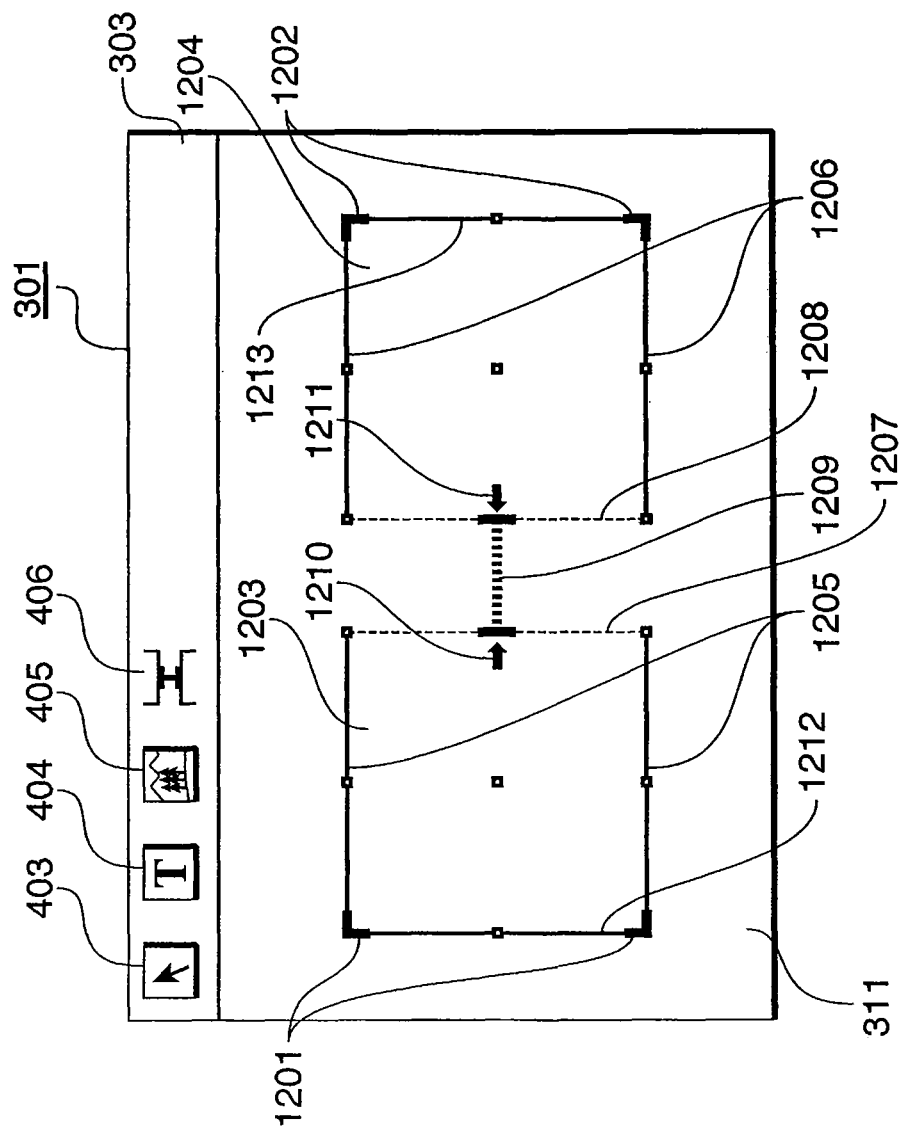
FIG. 13 is a view showing the state of a general variable link.

FIG. 13 shows the state of a general variable link.

In nearly the same manner as in FIG. 5, the window 301 displays the tool bar 303 and document template 311, and containers 1203 and 1204 exist on the document template 311. The containers include sides 1205 and 1206 which are fixed by anchors 1201 and 1202. A link 1209 with a variable size is set between the containers 1203 and 1204 to connect them. Note that the containers 1203 and 1204 in such state are called "edge containers" in some cases. Since the link 1209 is set, a right side 1207 and a left side 1208 of these containers are expressed by the broken lines, and extend/shrink icons 1210 and 1211 are displayed. That is, as shown in FIG. 13, the sides 1207 and 1208 are variable.

Figure 14:
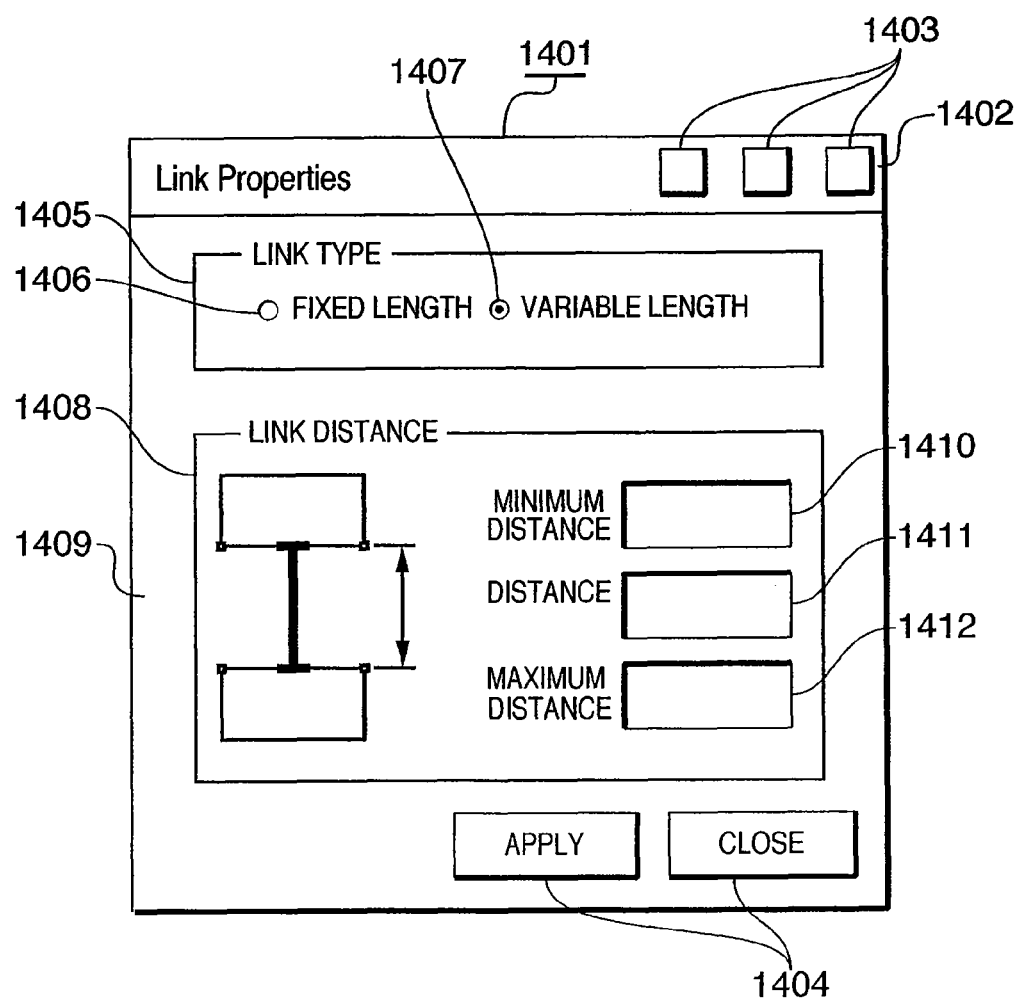
FIG. 14 is a view showing a dialog used to set link information.

FIG. 14 shows an example of a dialog 1401 used to set information of the link 1209.

The dialog 1401 includes a title bar 1402, tool buttons 1403, buttons 1404 used to apply the settings on the dialog or to close the dialog, and a region 1409 on which various kinds of information are set. A link with a variable or fixed length can be set by one of radio buttons 1406 and 1407 on a "link type" field 1405. In case of the variable-length link, a maximum value, minimum value, and current value of the distance of the link can be set using text boxes 1410 to 1412 on a "link distance" field 1408.

Figure 15:
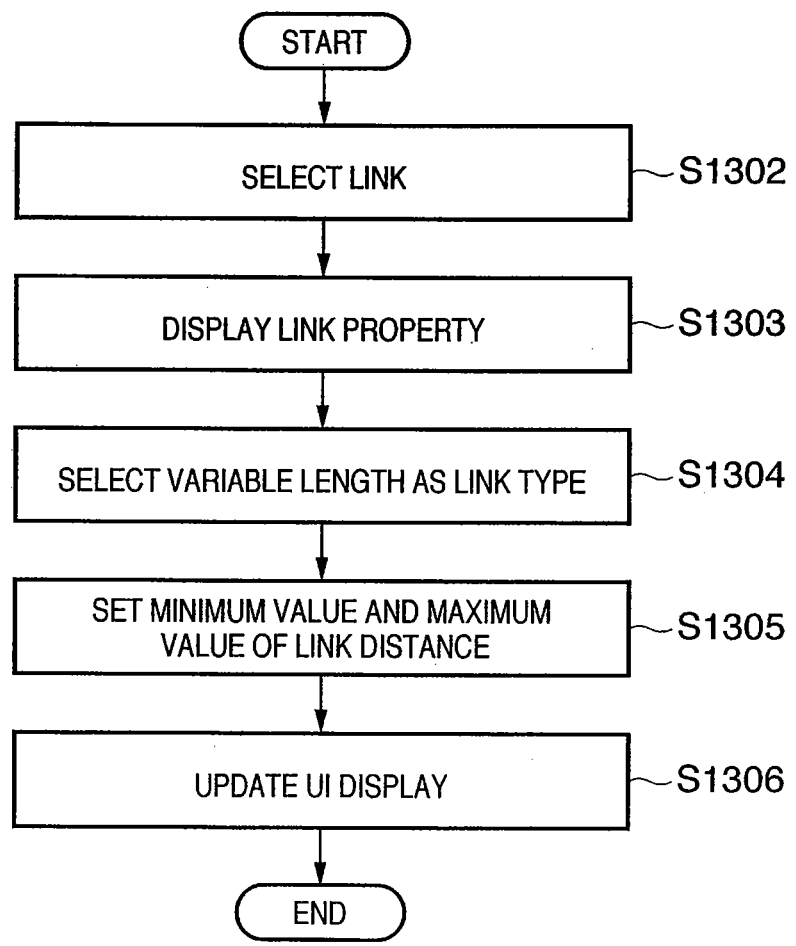
FIG. 15 is a flowchart showing a link setting method.
Figure 16:
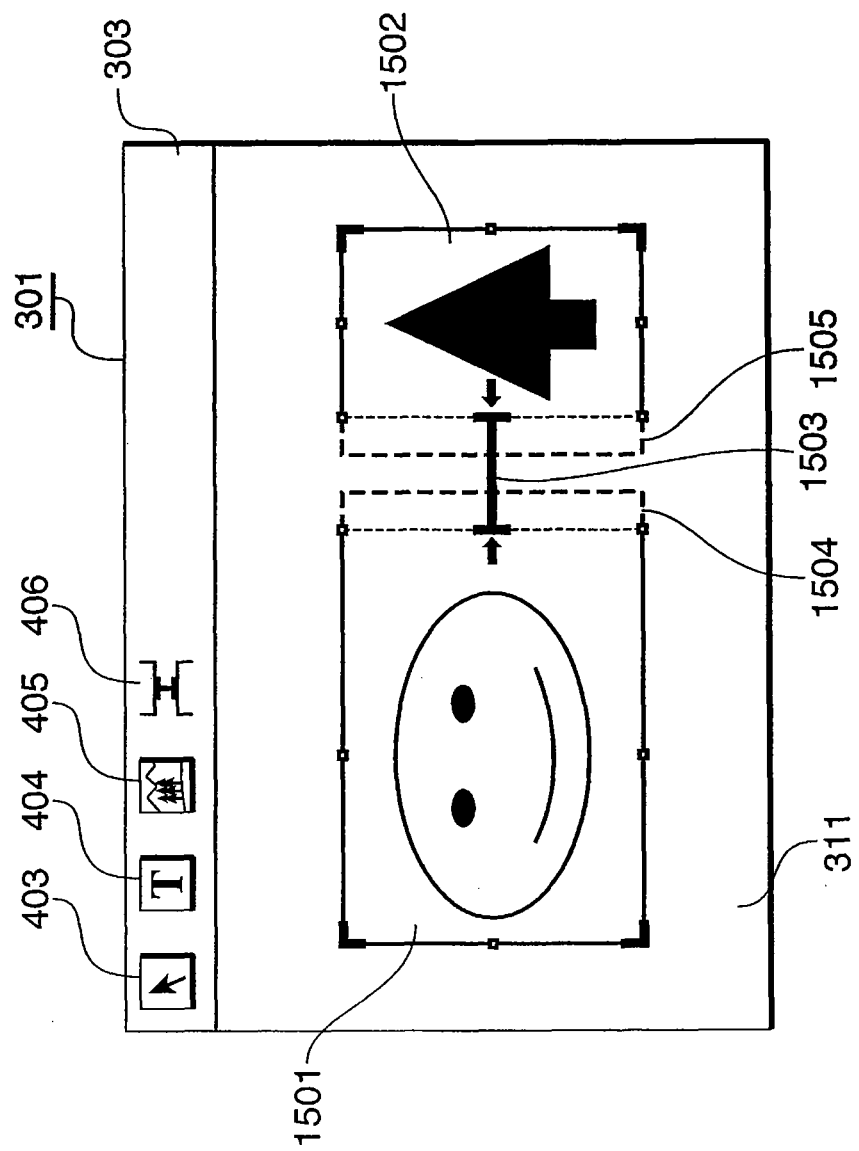
FIG. 16 shows a layout result upon using a fixed-length link.

FIG. 15 is a flowchart showing the link setting method, and shows the operation for changing a fixed-length link set between containers 1501 and 1502, e.g., in FIG. 16 to the variable-length link 1209 shown in FIG. 13 in accordance with the link setting method shown in FIG. 7. Note that the layout edit application 121 provides the processing shown in FIG. 15 to the user.

The user moves the cursor pointer and selects the link 1503 by clicking (S1302). Then, the user displays the dialog 1401 shown in FIG. 14 by the operation of the mouse 133 or the key operation of the keyboard 132 (S1303). At this time, since the link 1503 has a fixed length, the radio button 1406 is selected.

Next, the user selects the radio button 1407 to change the link 1503 to a variable length (S1304). With this operation, the text boxes 1410 to 1412 laid out on the "link distance" field 1408 are enabled to allow numerical value settings. The user sets appropriate values in the text boxes 1410 to 1412 to set the distance of the link 1503 (S1305). Next, when the user presses the button 1404 to apply the settings, the display state of the link 1503 changes to that of the link 1209 shown in FIG. 13 (S1306). Note that the setting information on this dialog 1401 is stored in a predetermined area of the memory 136.

FIG. 16 shows the layout result when the fixed-length link 1503 is used. This layout calculation is made as described above.

For example, assume that contents with different sizes are to be inserted into the containers 1501 and 1502 shown in FIG. 16. The size of the content is considered as an optimal size, and the container 1501 extends to the right to be close to a size (optimal container size) denoted by reference numeral 1504 so as to attain the size of the content to be inserted. Likewise, the container 1502 extends to the left to be close to an optimal container size denoted by reference numeral 1505 so as to attain the size of the content to be inserted.

However, the fixed-length link 1503 is set between the containers 1501 and 1502, and the left side of the container 1501 and the right side of the container 1502 are fixed by anchors. For this reason, the sizes of the containers 1501 and 1502, which are preferentially calculated upon layout calculation, are changed. As a result, the containers 1501 and 1502 cannot assure optimal sizes suited to the content sizes, and have container sizes smaller than the optimal container sizes 1504 and 1505. In other words, since the link 1503 has a fixed length, the containers 1501 and 1502 cannot attain their optimal container sizes.

Figure 17:
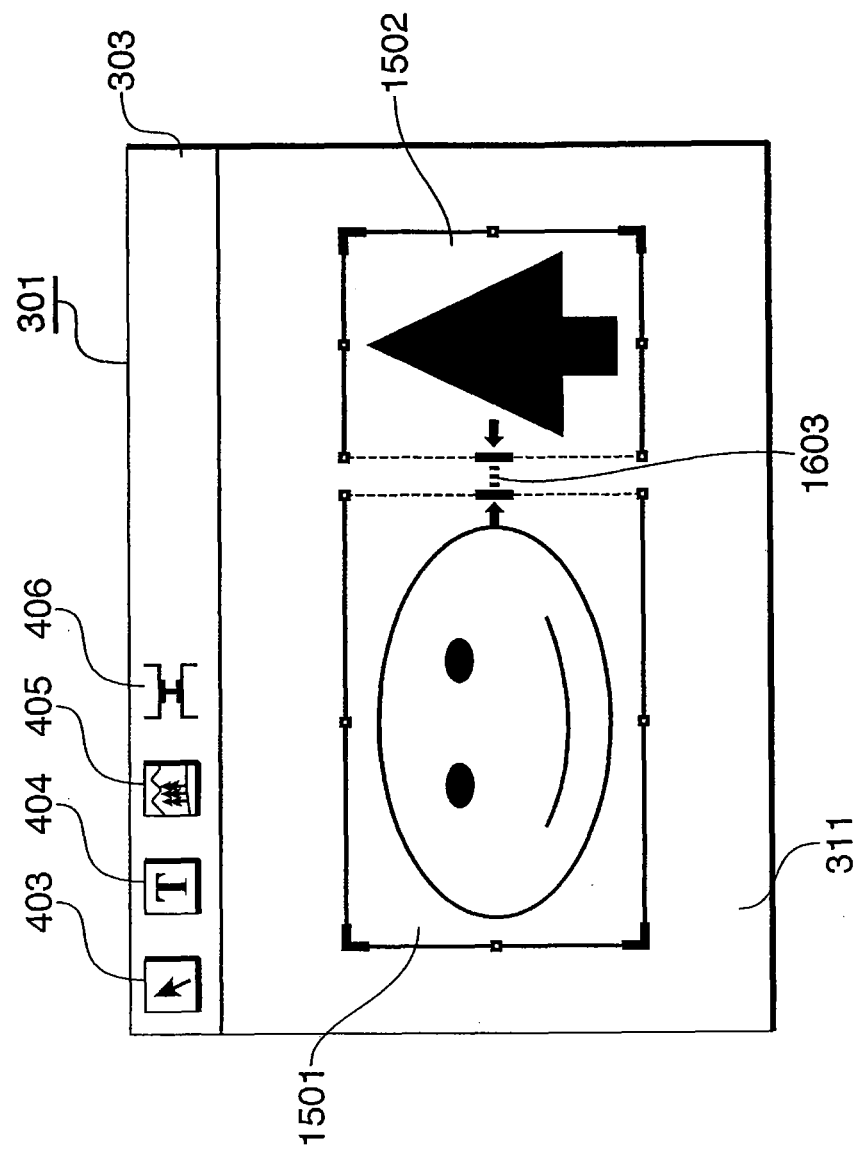
FIG. 17 shows a layout result upon using a variable-length link.

FIG. 17 shows the layout result when a variable-length link 1603 is used. This layout calculation is made as described above.

When the variable-length link 1603 is set between the containers 1501 and 1502, the distance of the link 1603 can be reduced upon changing the sizes of the containers 1501 and 1502. As a result, the sizes of the containers 1501 and 1502 can be extended more than the example of FIG. 16, and optimal container sizes suited to the content sizes can be achieved, or sizes closer to the optimal container sizes can be obtained.

[Layout Process]

Layout Based on Correlations Set for Role

The layout edit application 121 lays out containers to have optimal container sizes based on correlations set for respective roles and the properties of records set in the containers.

Figure 18:
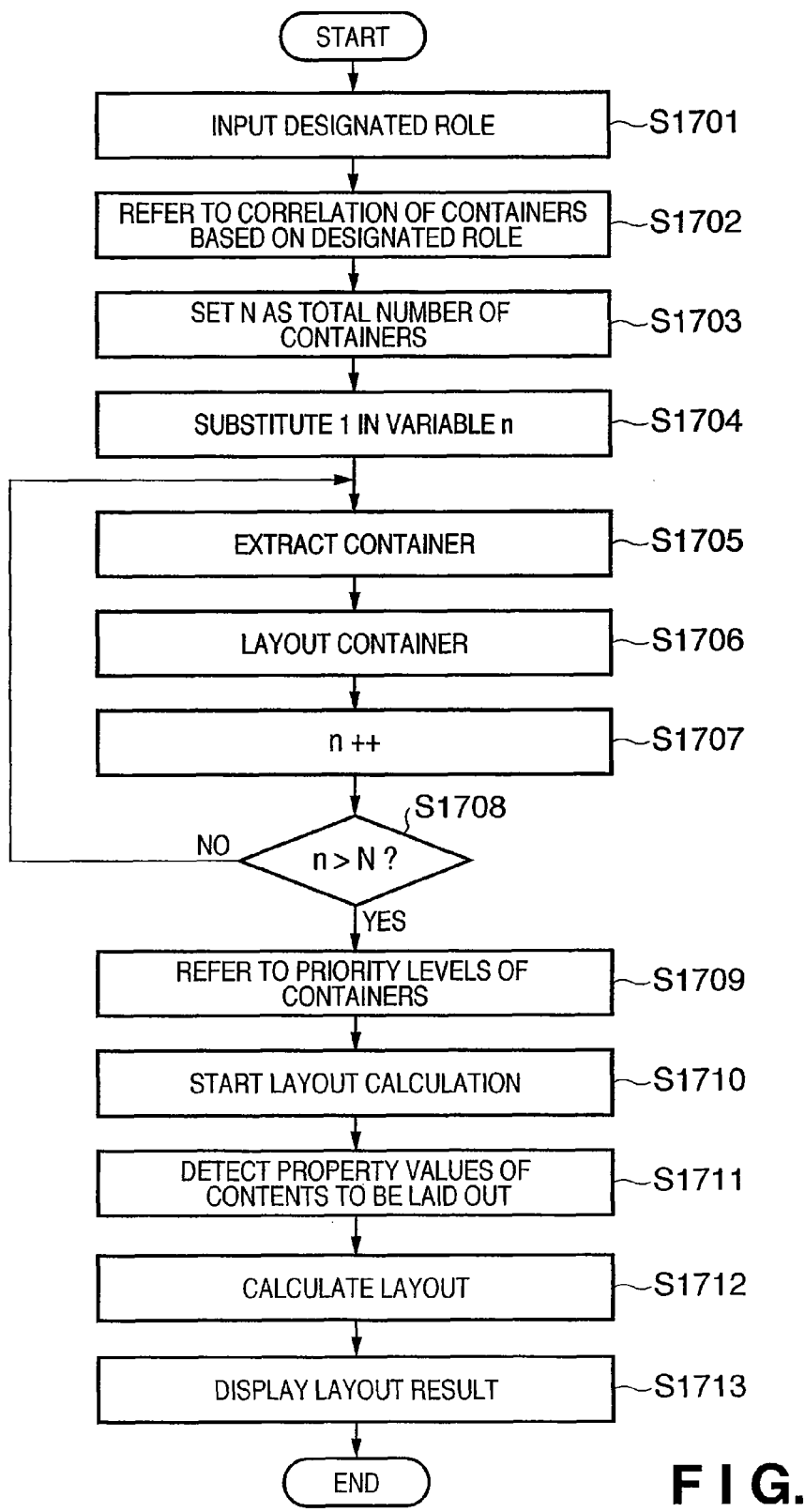
FIG. 18 is a flowchart showing a layout based on correlations set for roles.

FIG. 18 is a flowchart showing a layout based on correlations set for roles, and shows processing to be executed by the layout edit application 121.

A role designated by the user is input (S1701), and correlations of containers registered in the designated role are referred to (S1702). Note that the setting of the role and the correlations of containers will be described later.

The total number of containers is set in register N (S1703), and 1 is substituted in variable n (S1704). Containers are extracted based on the correlations referred to (S1705), and are laid out (S1706), thus incrementing variable n (S1707). The processes in steps S1705 to S1707 are repeated until n>N is decided in step S1708, thus laying out all containers.

The priority levels of the containers are referred to (S1709) to start a layout calculation (S1710).

The properties of contents set in the containers are detected (S1711). The actual size of each content stored in the DB 119 is obtained from the property of that content. When static text or image is inserted in a content, a size including its size is acquired. A layout is calculated based on the properties of the contents and setting values set in the containers (S1712), and the layout result is displayed on a window provided by the UI 103 (S1713).

Set Role

Each user may register roles or each group including a plurality of users may register them.

Figure 19:
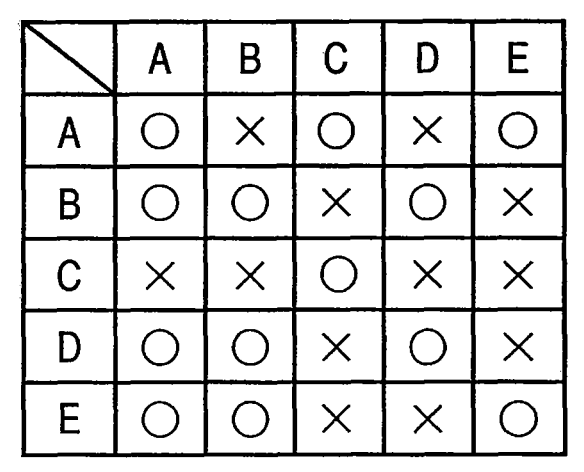

FIG. 19 shows a registration example of a correlation table. A to E shown in FIG. 19 indicate contents, ○ indicates display, and X indicates non-display. The leftmost column indicates main display contents, and the uppermost row indicates sub display contents. For example, in an example of the second row that main-displays content A, contents C and E are sub-displayed in addition to content A. Such table can be registered for each role.

Correlation of Containers

Figure 20:
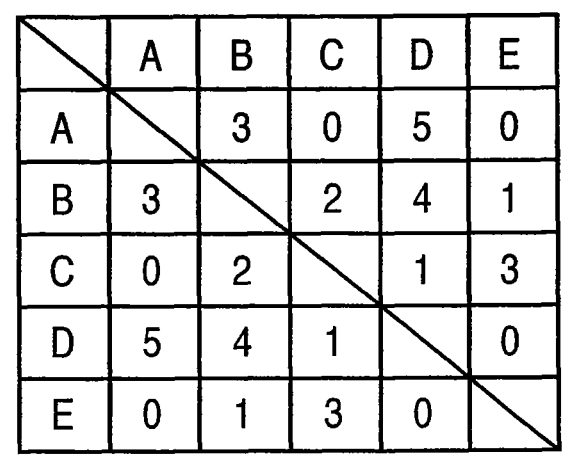

FIG. 20 shows display/non-display flags of containers, and their correlations. A to E shown in FIG. 20 indicate containers, and the numerical value in each cell indicates the display ratio of a container in the leftmost column to another container. For example, when container A in the second row is selected, containers B, C, D, and E are displayed at ratios of 3, 0, 5, and 0 with respect to container A. Note that container A itself is displayed in the set container size. In this manner, the correlation table shown in FIG. 20 has flags indicating display or non-display of containers.

Figure 21:
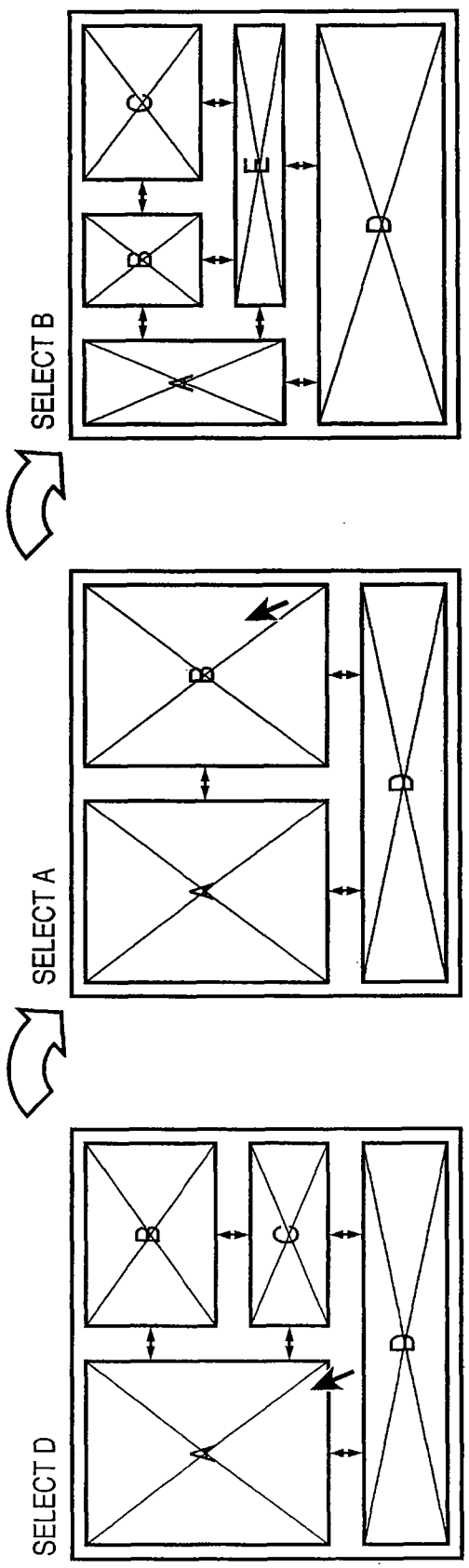
FIGS. 21A to 21C are views showing a display state example and transition example of containers.

FIGS. 21A to 21C show a display state example and transition example of containers.

FIG. 21A shows a display example of a state in which container D is selected. The layout of containers is decided based on selected container D and the correlation table shown in FIG. 20, and FIG. 21A displays the decided layout. In FIG. 21A, containers A, B, and C are displayed at ratios of 5, 4, and 1 with respect to container D. When container A is selected in this display state, the display state transits to that shown in FIG. 21B, containers B and D are displayed at ratios of 3 and 5 with respect to container A, and container C is not displayed. Furthermore, when container B is selected, the display state transits to that shown in FIG. 21C, containers A, C, and D are displayed at ratios of 3, 2, and 4 with respect to container B, and container E is also displayed at a ratio of 1. In this way, the layout is dynamically changed according to the selected container and the correlations of the containers. Also, correlation tables are registered in accordance with roles, and the layout of containers is decided based on the correlation table according to the designated role.

Layout Based on Unread/Read Management

FIG. 22 shows an example of a table for managing unread/read states about containers of each document for respective users (to be referred to as "unread/read management table" hereinafter). In this case, the unread/read management table is prepared for each document managed by the DB 119.

A document template is designated for each user and each group to which the user belongs or for each role of the user. The layout edit application 121 manages the unread/read states about respective containers used in a document created based on the document template for each user using the unread/read management table stored in the DB 119.

The first embodiment adopts the method of managing the unread/read states about respective containers for each user using the unread/read management table. However, the unread/read management method is not limited to that specific method. The last browsing date and time of each document for each user and the last update date and time of respective containers of each document may be stored in the DB 119, and the unread/read states about the respective containers of the document may be managed by calculating the time difference between the last browsing date and time and the last update date and time. In this case, if the last browsing date and time and the last update date and time have no time difference, each container is set in a read state, and if they have a time difference, that container is set in an unread state.

The last browsing date and time about each container of each document for each user and the last update date and time of each content may be stored in the DB 119, and the unread/read states about the respective containers of the document may be managed by calculating the time difference between the last browsing date and time and the last update date and time.

The method of managing the unread/read states about respective containers for each user will be described below. Also, the same effect can be obtained by managing the unread/read states about each content inserted in each container for each user.

Figure 23:
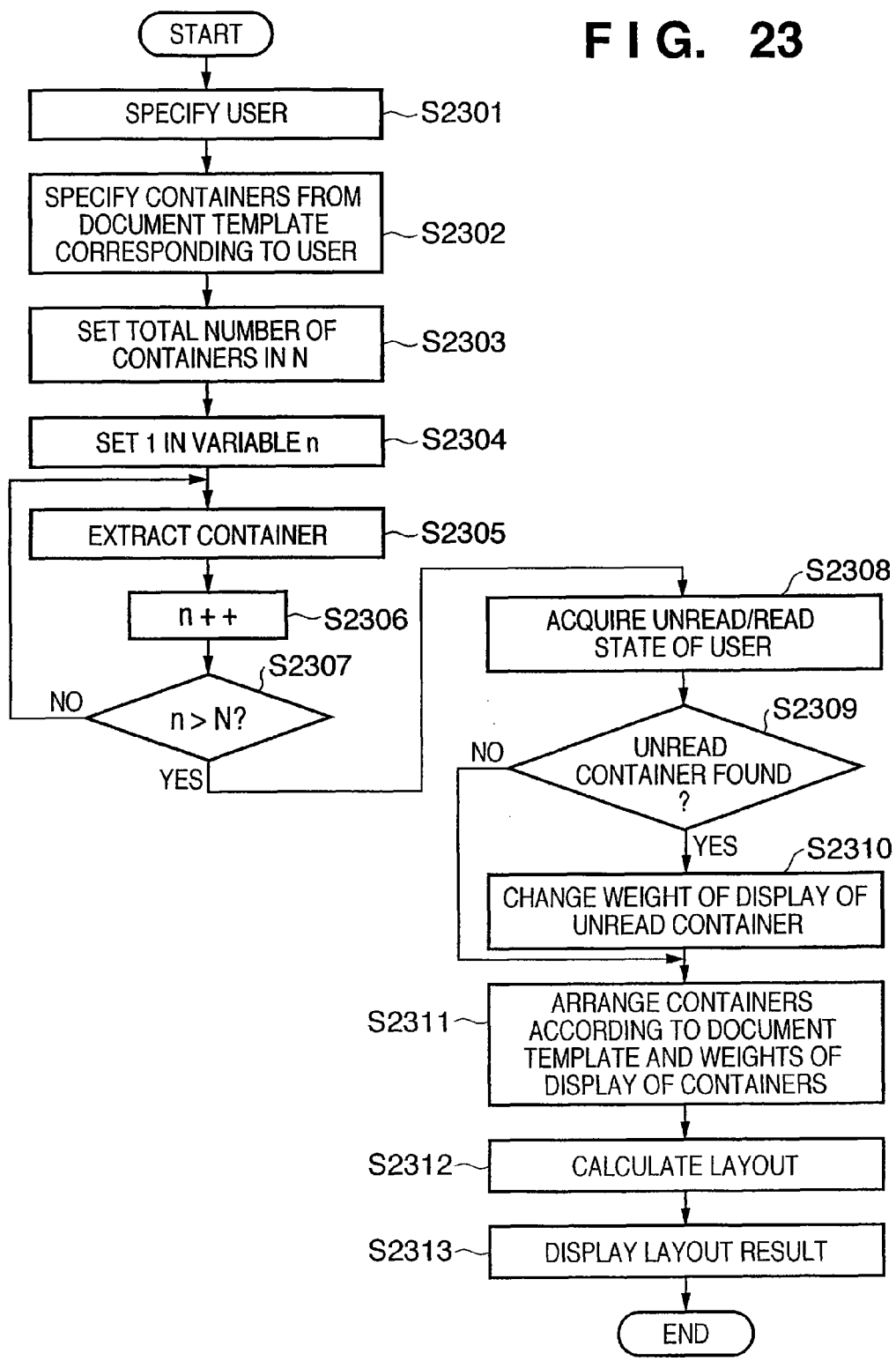
FIG. 23 is a flowchart for explaining a layout based on unread/read management.

FIG. 23 is a flowchart for explaining a layout based on management of the unread/read states. The layout edit application 121 executes this processing.

The user inputs user information such as a user name, password, and the like. The layout edit application 121 specifies, based on the input user information, the user who requests to display information (S2301), and specifies containers to be displayed based on information of the document template corresponding to the specified user (S2302).

The layout edit application 121 sets the total number of specified containers in a register N (S2303), and sets "1" in a variable n (S2304). The application 121 extracts one of the specified containers (S2305), and increments the variable n by 1 (S2306). The application 121 repeats the processes in steps S2305 and S2306 until n>N is determined in step S2307, thereby extracting all the specified containers.

Next, the layout edit application 121 acquires information indicating the unread/read states of the specified user with reference to the unread/read management table (S2308). The application 121 checks if unread containers are included (S2309). If unread containers are included, the application 121 changes the weights (priority levels of display) of the unread containers (S2310). The processing for changing the weights will be described later.

The layout edit application 121 arranges containers in accordance with the document template and the weights of display of the respective containers (S2311). The arrangement of the containers according to the document template and the weights of display of the respective containers will be described later. Then, the application 121 stores corresponding contents in the containers and calculates the layout according to the weights of display of the containers (S2312), and displays the layout result on the window provided by the UI 103 (S2313).

Assume that the layout edit application 121 executes the layout calculation processing in steps S2312 and S2313. Alternatively, the layout engine 225 may execute this processing.

Change Weight

Normally, the weight of display of each container is set to be "1" as a standard value (initial value). The weight of display of each unread container determined in step S2309 is changed to, e.g., "2" in step S2310. If all containers are unread, the weights of display of all the containers are changed to "2."

In case of user Y shown in the unread/read management table shown in FIG. 22, since containers B and E are unread, the weights of display of containers B and E are changed to "2," and those of remaining containers A, C, and G remain "1." Since the document template of user Y does not include containers D and F, no information indicating the weights of display and the unread/read states of these containers exists. Such change in weight is temporal; it is canceled upon completion of the layout calculation, and the weight returns to "1."

Arrangement of Containers

The layout edit application 121 checks the weights of display of the respective containers. When their weights are not equal to each other, the application 121 arranges the containers so as to preferentially display containers with larger weights. FIG. 24 is a flowchart showing the arrangement of containers in consideration of their weights of display, FIGS. 25A and 25B show an example of document templates, and FIGS. 26A and 26B show an example of the arrangement results of the containers.

Figure 25A:
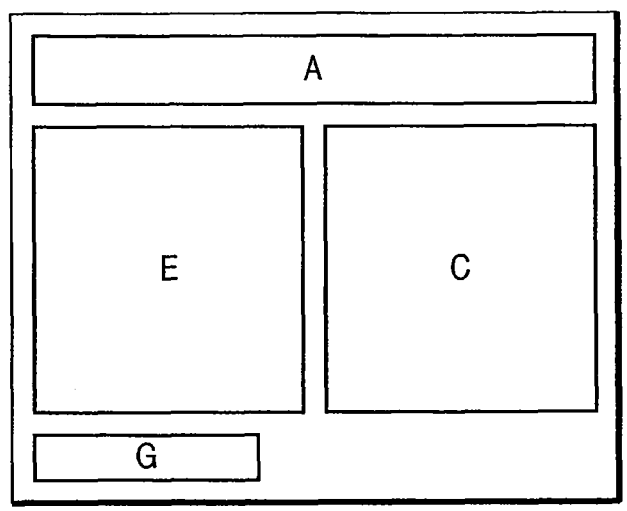
FIGS. 25A and 25B show an example of document templates.
Figure 25B:
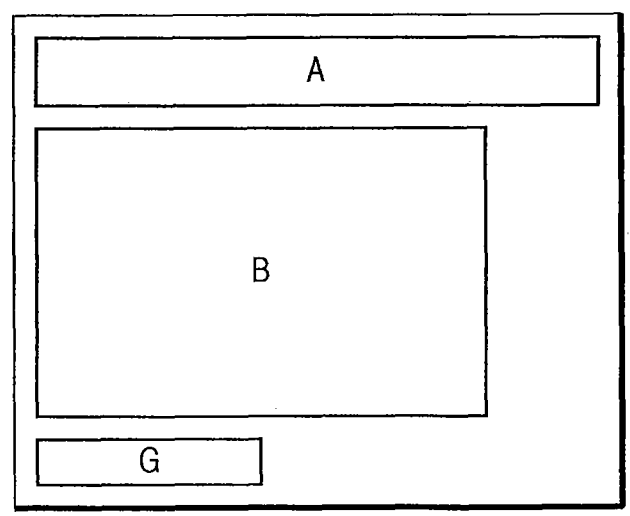
Figure 26A:
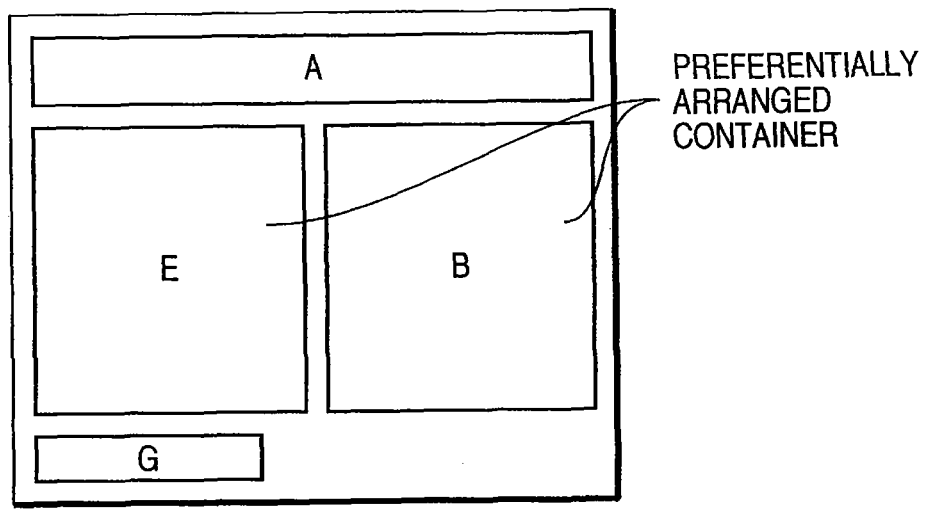
FIGS. 26A and 26B show an example of the arrangement results of containers.
Figure 26B:
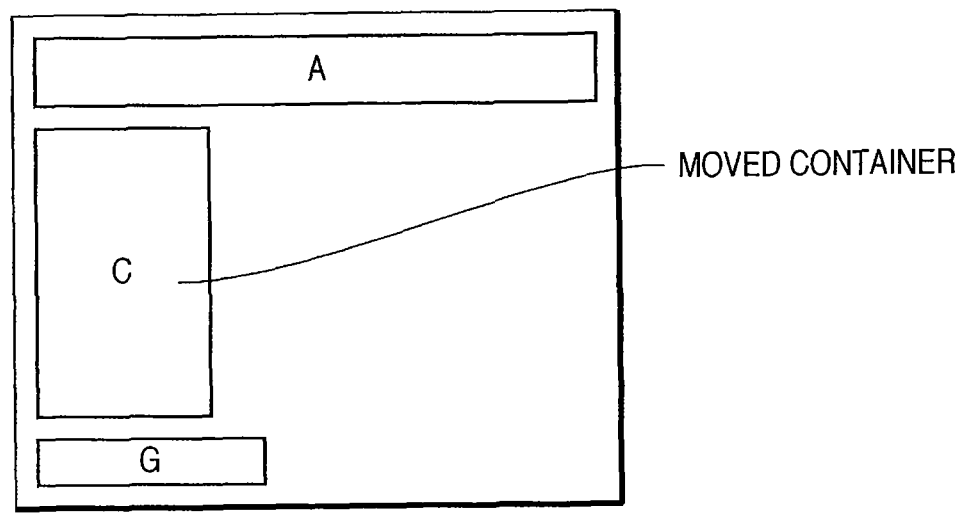

Assume that document templates for user Y shown in the unread/read management table in FIG. 22 have formats shown in FIGS. 25A and 25B. A document template of the first window shown in FIG. 25A defines a window to be presented first to user Y, and a document template of the second window shown in FIG. 25B defines a window which appears upon reception of a user instruction on the first window.

The layout edit application 121 specifies a document template of the user (S1901), and checks if all the weights of display set for containers included in the specified document template are equal to each other (S1902). If the unread/read states of user Y are those shown in FIG. 22, the weights of display of containers B and E are different from those of the remaining containers. Hence, the process advances to step S1903.

The layout edit application 121 arranges the containers to preferentially display containers B and E with larger weights of display (S1903). That is, contents to be inserted in containers B and E with larger weights of display are arranged in preference to those to be inserted in the remaining containers. As shown in FIG. 25A, the document template of the first window includes containers A, C, E, and G. In this case, since containers B and E are preferentially arranged, the arrangement result shown in FIG. 26A is obtained. Container C included in the document template of the first window is not arranged as a result of the preferential arrangement of containers B and E.

The layout edit application 121 arranges containers other than those which have been preferentially arranged in step S1903, based on the document template (S1904). Note that the application 121 arranges in consideration of containers which cannot be arranged due to the preferential arrangement in step S1903. In the above example, container B is arranged on the first window in place of container C. Hence, as shown in FIG. 26B, container C is arranged on the second window in place of container B (which has already been moved to the first window) included in the document template of the second window.

[Application Example of Layout System]

An application example of the aforementioned layout system to an electronic medical chart will be described in detail hereinafter. The electronic medical chart has various input controls and data, and has different contents to be displayed and browsed depending on doctors, nurses, medical engineers, pharmacists, medical clerks, and the like. Therefore, the aforementioned layout system sets roles for respective users or groups, and provides the contents to be displayed and browsed of the electronic medical chart that each individual user wants.

Document Templates of Electronic Medical Chart

FIGS. 27A to 27D show examples of electronic medical chart templates for a doctor (user) and nurse (user). FIGS. 27A and 27B show the document templates of a main window and sub window for the doctor. Containers A, B, C, D, E, F, and G respectively display contents of "patient name," "diagnosis," "additional information," "medication list," "prescription," "remarks," and "doctor's signature." FIGS. 27C and 27D show the document templates of a main window and sub window for the nurse. Containers A, B, C, E, and G respectively display contents of "patient name," "diagnosis," "additional information," "prescription," and "doctor's signature." On the document templates shown in FIGS. 27C and 27D, container D (medication list) and container F (remarks) are not set.

In the following description, "container" and "item" will be used as terms having nearly the same meaning in the electronic medical chart. For the sake of easy understanding of the relationship between the window display and items, item names (A, C, and the like) bounded by squares (□) are displayed on the upper left positions of the display areas of the items. However, these item names are not displayed in practice.

Creation of Electronic Medical Chart

Figure 28:
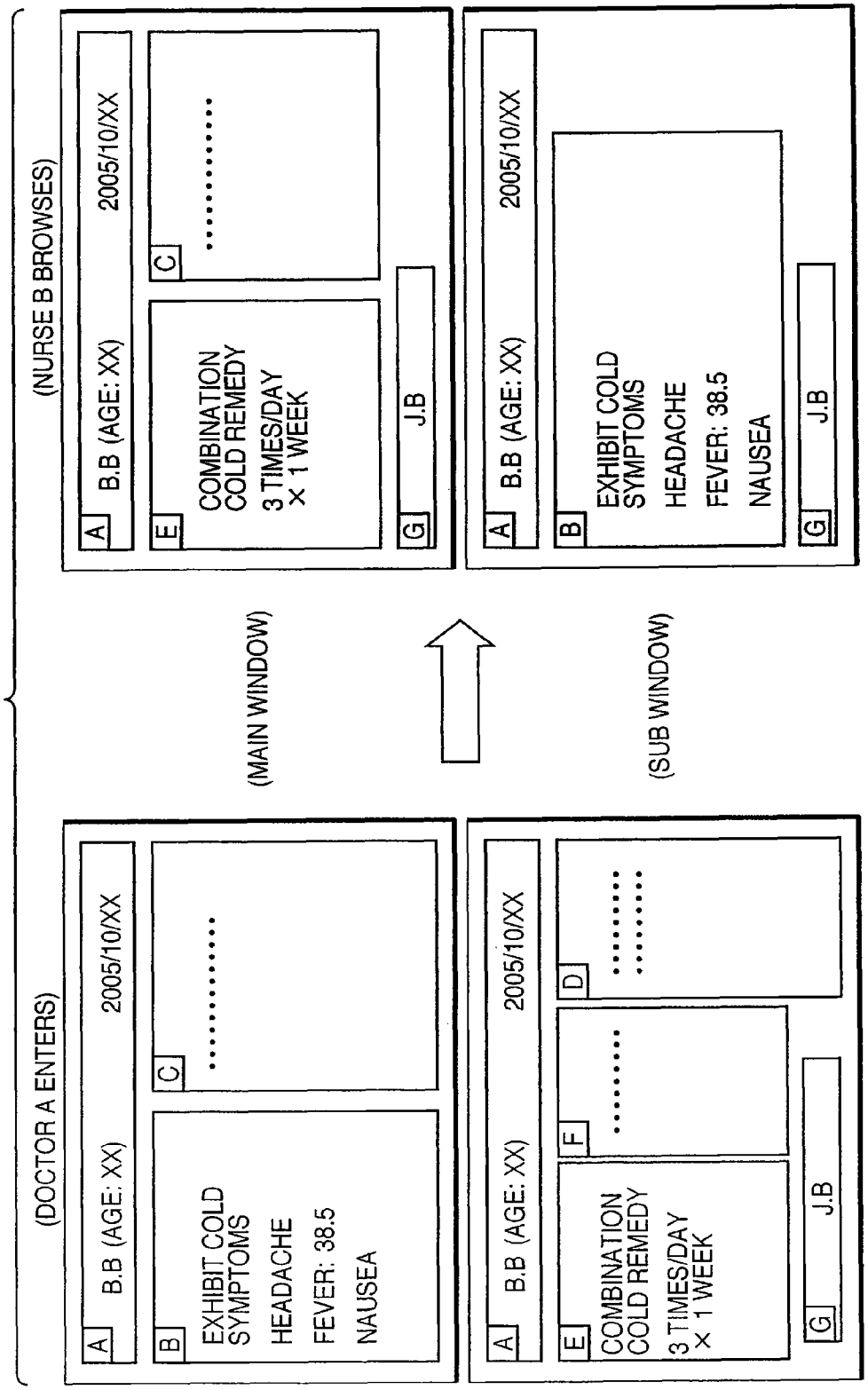
FIG. 28 shows an example of a main window and sub window when a doctor enters data in the electronic medical chart and, after that, a nurse browses it.

FIG. 28 shows an example of the main window and sub window when doctor A enters data in an electronic medical chart and, after that, nurse B browses it. FIG. 29 shows an unread/read management table corresponding to this electronic medical chart.

Before doctor A enters data in an electronic medical chart for the first time, the electronic medical chart, the layout of which is calculated to arrange containers according to the document templates for the doctor shown in FIGS. 27A and 27B, is displayed. When doctor A enters data in the electronic medical chart and saves it as a record in the DB 119, the DB server 117 detects update of information, and creates information of an unread/read management table about this electronic medical chart for respective users. That is, the DB server 117 creates information of an unread/read management table in which the unread/read states of doctor A are set as "read" and those of users other than doctor A are set as "unread" in association with the entry items (A to G) of doctor A.

After this electronic medical chart is saved, when nurse B accesses the electronic medical chart, since all the items are unread, the electronic medical chart, the layout of which is calculated to arrange the containers are arranged according to the templates for the nurse shown in FIGS. 27C and 27D, is displayed. In this case, the layout edit application 121 notifies the DB server 117 of execution of that display. Therefore, the DB server 117 changes the unread/read states of the respective items of the record for nurse B in the unread/read management table corresponding to the electronic medical chart to "read." On the other hand, the unread/read states of nurse C who has not displayed the electronic medical chart remain "unread."

Update of Electronic Medical Chart

A case will be explained below wherein the contents of the existing electronic medical chart have been changed.

Figure 30:
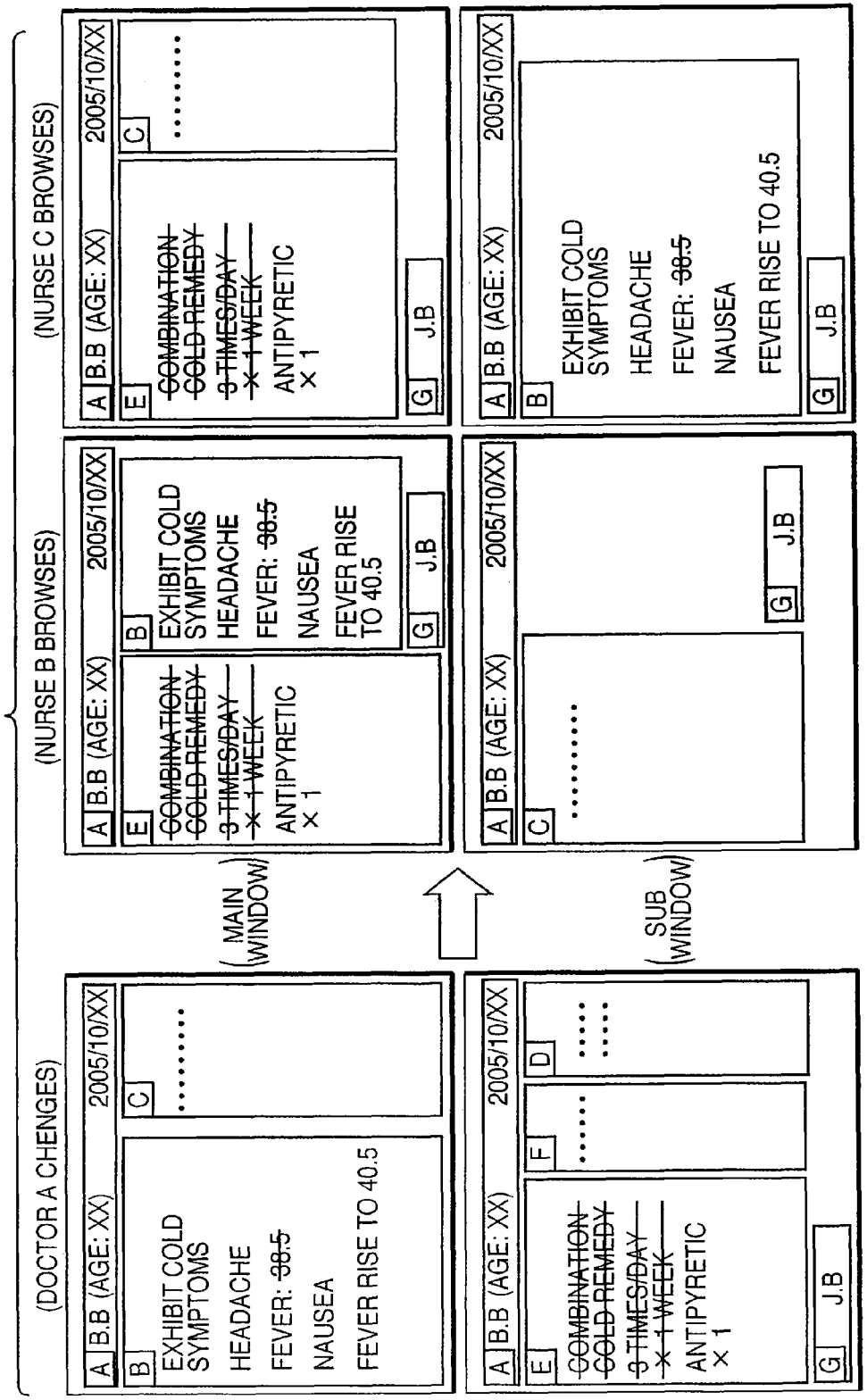
FIG. 30 shows an example of the main window and sub window when the doctor updates the contents the electronic medical chart and, after that, nurses browse it.

FIG. 30 shows an example of the main window and sub window when doctor A updates the contents of the electronic medical chart and, after that, nurses B and C browse it. FIG. 31 shows an unread/read management table at that time.

As shown in FIG. 30, when doctor A changes the contents of the existing electronic medical chart and saves it in the DB 119, the DB server 117 detects update of information, and updates the information of the unread/read management table of the users for this electronic medical chart. That is, as shown in FIG. 31, the unread/read states of items B and E in the unread/read management table, which have been changed by doctor A are changed to "read," and those of items B and E for users other than doctor A are changed to "unread."

When nurse B accesses the electronic medical chart after that electronic medical chart is updated, since items B and E are unread, the electronic medical chart, the layout of which is calculated to arrange containers so as to display updated items B and E on the main window, is displayed. As a result, item C is moved to the sub window. Of course, the layout edit application 121 notifies the DB server 117 of execution of that display. Therefore, the DB server 117 changes the unread/read states of the respective items for nurse B in the unread/read management table corresponding to the electronic medical chart to "read."

In this manner, the items, which have been changed by doctor A after the previous browse timing until the current browse timing of the electronic medical chart by nurse B, are laid out and displayed on the main window. Therefore, nurse B can easily find the changed portions, and can quickly and accurately know the changed contents. The changed portions of information having a plurality of display items like an electronic medical chart may often be overlooked. Overlooking the changed portions may lead to medical malpractices. According to the first embodiment, since changed portions are displayed on the main window, a display on which these changed portions are easily recognizable is presented to the user. Therefore, overlooking of the changed portions can be minimized.

On the other hand, when nurse C accesses the electronic medical chart after the electronic medical chart is updated, all the unread/read states of nurse C who has not browsed the electronic medical chart yet are "unread." Therefore, the electronic medical chart, the layout of which is calculated to arrange the containers according to the document templates (FIGS. 27C and 27D) of the nurse, is displayed. In other words, for nurse C, the changes made by doctor A are not the changed portions, and the electronic medical chart which is laid out as per normal is displayed. Of course, the layout edit application 121 notifies the DB server 117 of execution of that display. Therefore, the DB server 117 changes the unread/read states of the respective items for nurse C in the unread/read management table corresponding to the electronic medical chart to "read."

Figure 32:
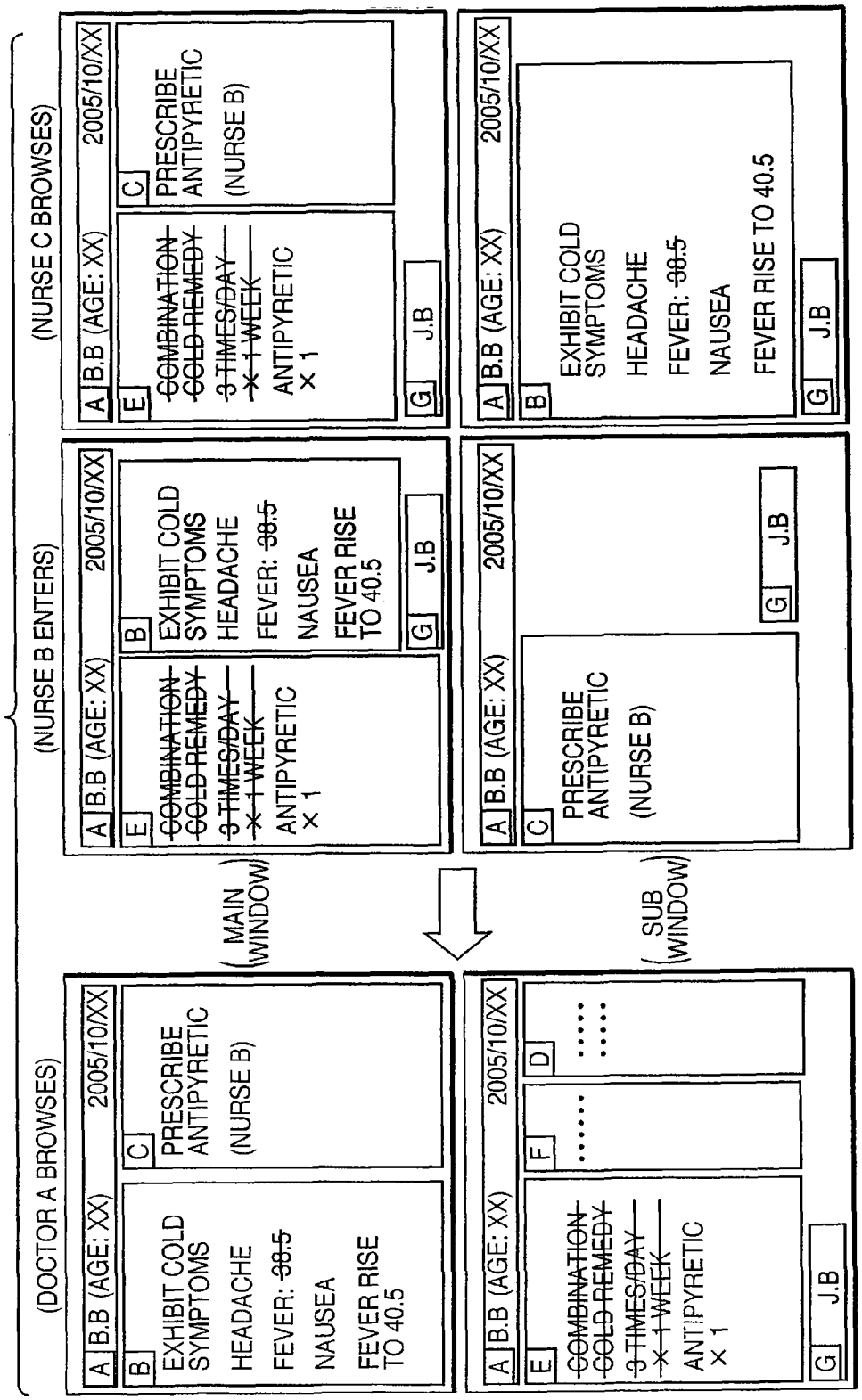
FIG. 32 shows an example of the main window and sub window when the nurse updates the contents of the electronic medical chart and, after that, another nurse and the doctor browse it.

FIG. 32 shows an example of the main window and sub window when nurse B updates the contents of the electronic medical chart and, after that, nurse C and doctor A browse it. FIG. 33 shows an unread/read management table at that time.

As shown in FIG. 32, when nurse B makes changes of the existing electronic medical chart and saves it in the DB 119, the DB server 117 detects update of information, and updates the information of the unread/read management table of the users for this electronic medical chart. That is, as shown in FIG. 33, the DB server 117 changes the unread/read state of nurse B for item C of the unread/read management table, which has been changed by nurse B, to "read," and changes the unread/read states of the users other than nurse B for that item to "unread."

When nurse C and doctor A access the electronic medical chart after this electronic medical chart is updated, since item C is unread, the electronic medical chart, the layout of which is calculated to arrange the containers so as to display updated item C on the main window, is displayed. In this case, the electronic medical chart is displayed according to the normal templates (FIGS. 27A to 27D). Of course, the layout edit application 121 notifies the DB server 117 of execution of that display. Therefore, the DB server 117 changes the unread/read states of the respective items for nurse B and doctor A in the unread/read management table corresponding to the electronic medical chart to "read."

In this way, nurse C and doctor A need not make a display operation to confirm the updated contents of the electronic medical chart in consideration of update of the electronic medical chart by nurse B. After update of the electronic medical chart, the electronic medical chart is laid out to display the changed portion on the main window. Therefore, the changed portion of the electronic medical chart can be easily, quickly, and accurately confirmed.

In the description of the above example, upon issuing the save instruction of the updated record, the unread/read states of all the users except for the user who has made the change automatically change to "unread." However, the present invention is not limited to such specific example. For example, the user who has made the change may instruct the layout edit application 121 or DB server 117 to change the unread/read states of an arbitrary user to "unread."

In the above example, when a given user browses the updated record, the unread/read states of that user automatically change to "read." However, the present invention is not limited to such specific example. For example, after display of the updated record, the user who browsed the record may instruct the layout edit application 121 or DB server 117 to change the unread/read states to "read." Upon browsing, a timing at which a given item falls outside the focus range after that item is focused may be decided as a "read" instruction of the user. After an elapse of a predetermined period of time since display of a given item, its unread/read state may be changed to "read." After browsing, when a print instruction of the electronic medical chart is issued and printing is done, the unread/read states may be changed to "read."

Second Embodiment

Information processing according to the second embodiment of the present invention will be described below. Note that the same reference numerals in the second embodiment denote the same components as those in the first embodiment, and a detailed description thereof will be omitted.

The second embodiment is the same as the first embodiment, except for the processing for arranging containers, and that when the unread/read states change, the layout is dynamically re-calculated and re-displayed, and the processing for arranging containers is changed in accordance with importance levels which are set for containers in correspondence with roles of users.

[Arrangement of Containers]

As in the first embodiment, the following explanation will be given taking user Y shown in FIG. 22 as an example. For user Y, since containers B and E are unread, their weights change to "2," and those of remaining containers A, C, and G remain "1." FIG. 34 shows an example of a table for managing importance levels of containers for respective roles (to be referred to as "importance level management table" hereinafter). The role of user Y corresponds to role 2 in the importance level management table.

In the processing for arranging containers (S1903 in FIG. 24), when containers B and E with larger weights of display are to be arranged, the importance levels of these containers B and E are compared with reference to the importance level management table, and they are preferentially arranged in descending order of importance level in the second embodiment. In case of user Y with role 2, since container B has importance level "6" and container E has importance level "4," container B is arranged first, and container E is then arranged. Furthermore, the same applies to the processing for arranging containers other those which are already preferentially arranged (S1904 in FIG. 24). That is, in case of user Y with role 2, containers are arranged on the remaining space in the order of container A (importance level "10"), container G (importance level "9"), and container C (importance level "8").

In this manner, since the importance levels are set for containers, and the arrangement processing of the containers is controlled in accordance with the importance levels, containers with higher importance levels according to the role of the user of the unread containers are preferentially arranged and undergo the layout calculation. Therefore, overlooking of the changed contents can be effectively prevented.

Application Example

An application example of the layout system to an electronic medical chart as in the first embodiment will be explained hereinafter.

Assume that doctor A creates an electronic medical chart, nurse B browses it, and after that, doctor A makes changes of items B and E of that electronic medical chart (see FIG. 30). FIG. 35 shows an example of the importance level management table. Assume that the importance levels of a doctor and nurse for respective items are set as shown in FIG. 35. FIG. 35 shows an example of the main window and sub window when doctor A updates the electronic medical chart and, after that, nurse B browses it.

When nurse B browses the electronic medical chart again, items whose unread/read states are "unread" are B and E. The importance levels of items B and E are respectively "6" and "4" according to the role of the nurse. Hence, as shown in FIG. 36, when nurse B browses the electronic medical chart, the window is displayed while item B is arranged on the left side and item E is arranged on the right side. Also, the remaining read items are also arranged according to their importance levels. Therefore, a display that arranges the changed contents which are important for the nurse, i.e., information which must be accurately reported from the doctor to the nurse at the easiest-to-see position, can be made.

Next, a case will be described below wherein nurse B issues an instruction to change the unread/read states of unread items to "read" during browsing. Note that in the first embodiment, browsing of unread items is used as a trigger upon changing the unread/read states to "read." In the second embodiment, a case will be explained below wherein the user focuses an unread item using a mouse or the like, and moves the focus to fall outside the unread item to issue a change instruction to "read."

Nurse B focuses unread item B of the electronic medical chart, and moves the focus to another item to issue a change instruction to "read." Upon issuance of the change instruction to "read," the DB server 117 updates the unread/read management table of that electronic medical chart, and the layout edit application 121 restarts processing from step S2308 in FIG. 23. FIG. 37 shows the unread/read management table at that time.

The layout edit application 121 acquires information of the unread/read management table (S2308) and checks if another unread item exists (step S2309). Although the unread/read state of item B is changed to "read," since that of item E is "unread," the process advances to step S2310 to change the weight of display of unread item E (S2310) and to arrange respective items according to their weights of display and importance levels (S2311). The application 121 re-calculates the layout (S2312), and re-displays the layout result on the window provided by the UI 103 (S2313).

FIG. 38 shows the window displayed as a result of the layout re-calculation. Unread item E is arranged at the easiest-to-see position. Since read items with weights="1" of display are arranged according to their importance levels, item C having a higher importance level than item B moves to the main window, and item B moves to the sub window.

In this manner, when the user who browses the electronic medical chart moves a focus from one item to another, an unread item changes to "read," and the display layout finally approaches to that of the document template when that user browses the electronic medical chart. That is, the user issues a change instruction to "read" by focusing an unread item and moving the focus to another item, thus returning to a normal display layout. Put differently, when the display layout is not an ordinary one familiar to that user, it indicates that there is an unread item, and overlooking of the changed item can be prevented.

Third Embodiment

Information processing according to the third embodiment of the present invention will be described below. Note that the same reference numerals in the third embodiment denote the same components as those in the first and second embodiments, and a detailed description thereof will be omitted.

[Mail Notification]

In a system which allows the user to browse data managed by the DB server 117 from anywhere using the host computer 101, it is hard for the user to determine which items have changed. Furthermore, since various users can browse from anywhere, it is difficult for user A to identify users who recognized the change contents he or she had made. In case of information described on a paper sheet, it is estimated that the user who has that paper sheet recognizes the change. However, in the above system, it is difficult to estimate users who browsed the changed data. In case of information with complicated display contents like an electronic medical chart, even the user who browsed that information may not notice the changed contents.

To solve this problem, when the user who browsed information issues an instruction to change the unread/read state of an item to "read," user A who has made the change of that item is notified of the change in unread/read state of that item to "read" via an e-mail message. In this way, user A can confirm the user who recognized the change contents he or she had made.

FIG. 39 shows an example of a table which manages the user who has made a change to change the unread/read states of all users to "unread" in combination with unread/read management (to be referred to as a "state change management table" hereinafter). Note that the DB server 117 prepares state change management tables for respective documents in the DB 119, and stores them in the DB 119. FIG. 40 shows an example of a user information table managed by the DB server 117.

Figure 41:
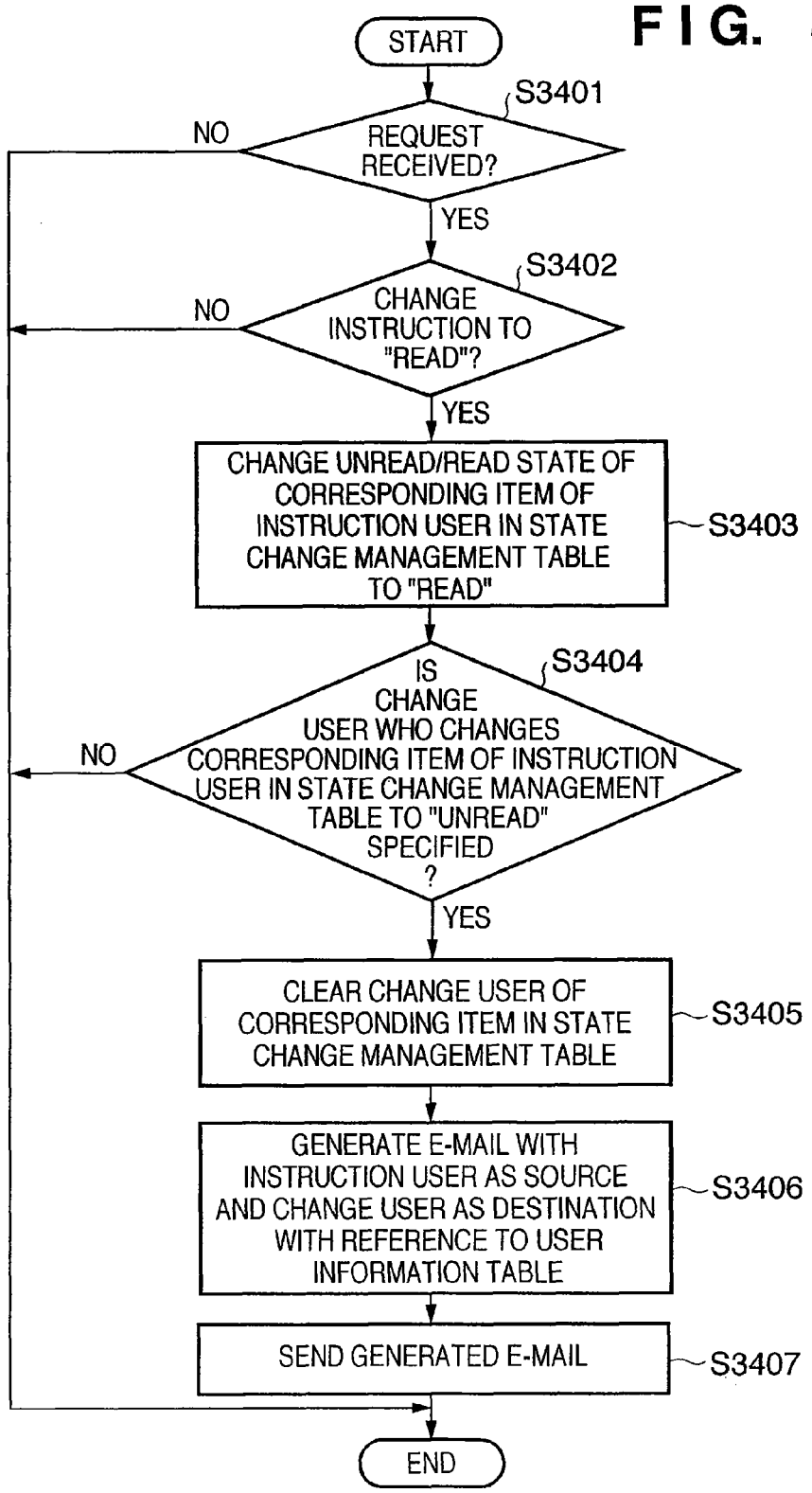
FIG. 41 is a flowchart showing mail notification processing.

FIG. 41 is a flowchart showing the mail notification processing. The DB server 117 executes this processing.

Upon reception of a request from the layout edit application 121 (S3401), the DB server 117 checks if the received request is a change instruction to "read" for an item of an arbitrary document (S3402). If the request is not a change instruction to "read," the DB server 117 ends processing. On the other hand, if the request is a change instruction to "read," the server 117 updates information of the state change management table of that document, and changes the unread/read state of that item for a user who instructed the state change (to be referred to as "instruction user" hereinafter) to "read" (S3403).

Next, the DB server 117 specifies, with reference to the state change management table, a user who has made a change of the item to change the unread/read state of that item of the instruction user to "unread" (to be referred to as "change user" hereinafter) (S3404). If the change user cannot be specified, the server 117 ends processing. If the change user can be specified, the server 117 clears the change user of that item in the state change management table (S3405).

The DB server 117 generates an e-mail message which includes the mail address of the instruction user as a source address, and that of the change user as a destination address, with reference to the user information table (S3406). In this case, the server 117 may add a message "<nurse B> changed the unread/read state of the changed contents of <prescription> of a patent <patient name> to "read"" or the like to the title or body text of the e-mail message based on the information acquired from, e.g., the state change management table. Note that < . . . > may change depending on e-mail messages to be generated. The server 117 sends the generated e-mail message to a mail server (not shown) (S3407), thus ending the processing.

The e-mail message is received by the host computer 101 of the destination user via the mail server. Therefore, the user who has changed the contents of the item can determine that the user who has changed the unread/read state recognized the changed contents of the item he or she had made.

Note that the third embodiment is premised on that the change user is always set in the state change management table. However, the change user information need not always be set. For example, the user who has made the change may want in some cases to receive via an e-mail message a state change notification of only a container for which he or she wants to know if a change to "read" is made. In such case, change user information may be set for that container. However, in this case, since the change user cannot be specified in step S3404, the processing ends without executing the processes in step S3405 and subsequent steps.

Application Example

An application example of the layout system to an electronic medical chart as in the first embodiment will be explained hereinafter.

Assume that doctor A creates an electronic medical chart, nurse B browses it, and after that, doctor A makes changes of items B and E of that electronic medical chart (see FIG. 30). Also, assume that nurse B focuses item B, and then issues a change instruction to "read" by moving the focus to another item, as in the second embodiment.

The layout edit application 121 notifies the DB server 117 of this change instruction to "read." The DB server 117 specifies based on the state change management table that the change user of item B is doctor A. The DB server 117 acquires the mail addresses of the instruction user (nurse B) and change user (doctor A) from the user information table, and sends an e-mail message set with nurse B as a source and doctor A as a destination, thus notifying doctor A that nurse B has changed the unread/read state of item B to "read."

By notifying via an e-mail message that the unread/read state of the changed item changed to "read," doctor A can determine that nurse B recognized the change contents he or she had made. If doctor A does not receive that e-mail message after he or she has changed the contents of the item, he or she can take action, e.g., he or she reminds the nurse to confirm the change contents of the item using another method of talking directly or via a phone.

Fourth Embodiment

Information processing according to the fourth embodiment of the present invention will be described below. Note that the same reference numerals in the fourth embodiment denote the same components as those in the first to third embodiments, and a detailed description thereof will be omitted.

The fourth embodiment executes the processing for arranging containers in consideration of an elapsed time after a given container is set in an unread state.

FIG. 42 shows an example of a state change management table. The DB server 117 manages "change date and time" to the unread state using the state change management table (FIG. 42) of the fourth embodiment as a time stamp in place of "change user" managed in the state change management table (see FIG. 39) of the third embodiment.

As in the first embodiment, the following explanation will be given taking user Y shown in FIG. 22 as an example. For user Y, since containers B and E are unread, their weights change to "2," and those of remaining containers A, C, and G remain "1."

Figure 43:
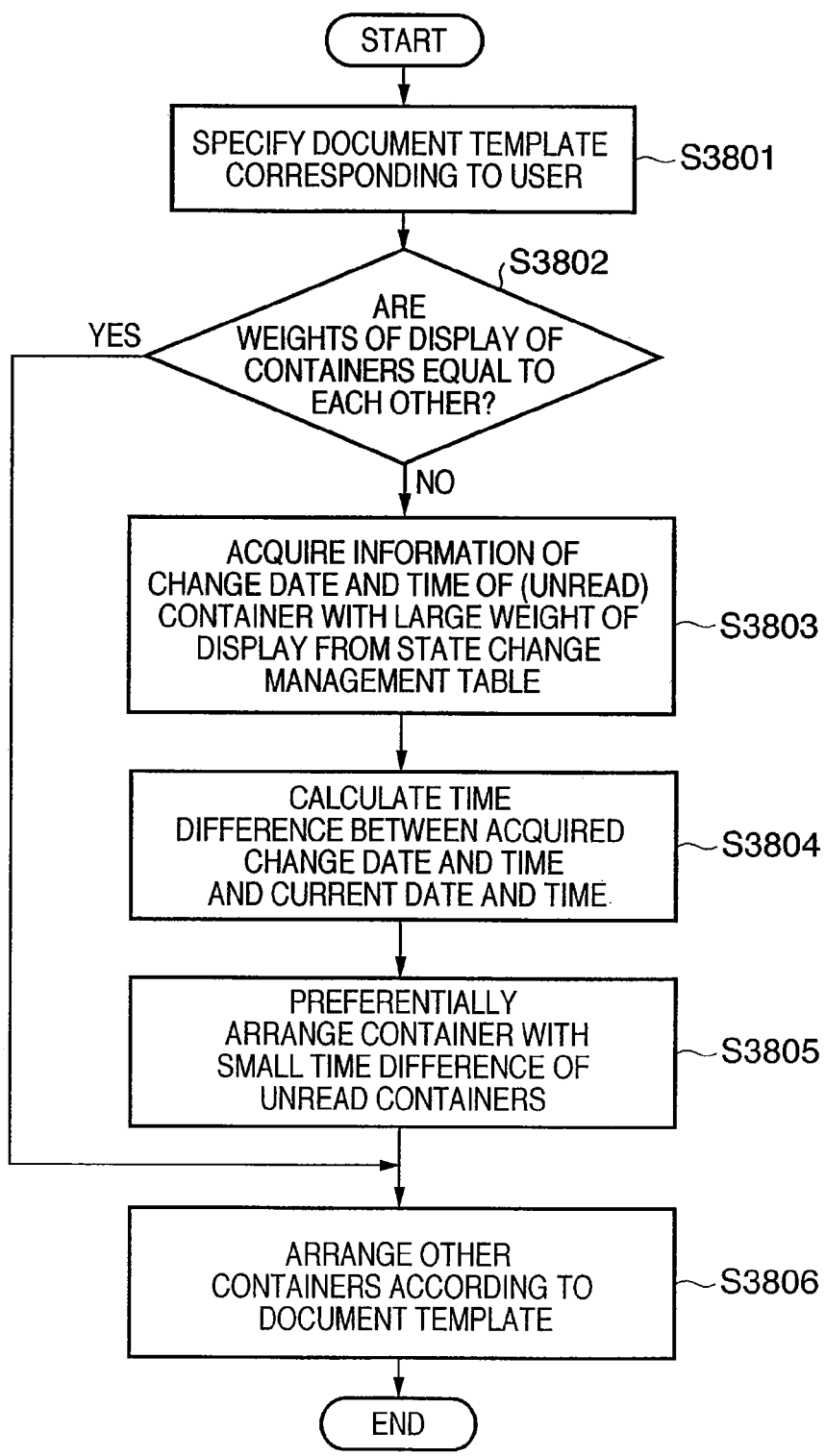
FIG. 43 is a flowchart showing the arrangement processing of containers.

FIG. 43 is a flowchart showing the arrangement processing of containers. The layout edit application 121 executes this processing.

The layout edit application 121 specifies a document template corresponding to user Y (S3801), and checks the weights of display of containers specified by the specified document template (S3802). If the weights of display of all the containers are equal to each other, the process advances to step S3806.

If containers with different weights of display (i.e., unread containers) are included, the layout edit application 121 acquires the update date and time information of the unread containers (with large weights of display) from the state change management table (S3803). The application 121 then calculates time differences between the acquired change dates and times and the current date and time (S3804). Then, for the unread containers, the application 121 preferentially arranges a container with a smaller time difference (S3805). In the example of FIG. 42, the unread containers are arranged in the order of container E and container B.

The layout edit application 121 arranges containers other than those which are arranged in step S3805 on the remaining space of the first window or the second window in accordance with the document template information (S3806).

By arranging containers in consideration of elapsed times after the unread state, a container which was set in an unread state recently is preferentially arranged. As a result, information which changed recently is considered as that whose importance level is high for the user, so as to arrange containers. Although depending on the types of information, newer information often has a higher value. In such case, as described in the fourth embodiment, information which changed recently is preferentially arranged. Therefore, information which has a higher value for the user is displayed at an easy-to-see position.

Fifth Embodiment

Information processing according to the fifth embodiment of the present invention will be described below. Note that the same reference numerals in the fifth embodiment denote the same components as those in the first to fourth embodiments, and a detailed description thereof will be omitted.

[Mail Notification]

When the unread/read state of a container, which is designated in advance by the user, changes to "unread," the fifth embodiment notifies that user of this via an e-mail message.

If there is a container including important information, it is desired for the user to browse that information immediately after the information of that container is updated. Hence, when the unread/read state of a container designated in advance by the user changes to "unread," information indicating the user who has changed the contents of that container to change its unread/read state to "unread" is sent as an e-mail message.

FIG. 44 shows an example of a table which manages containers for which a notification is to be issued when their unread/read states change to "unread" (to be referred to as "change notification" hereinafter) (to be referred to as "change notification management table" hereinafter). Note that the DB server 117 prepares change notification management tables for respective documents or document templates in the DB 119, and stores them in the DB 119. Each user updates the change notification management table, i.e., sets ON/OFF of notification, via the layout edit application 121. Information of the user who has changed the contents of each container is managed by the state change management table, as shown in FIG. 39.

Figure 45:
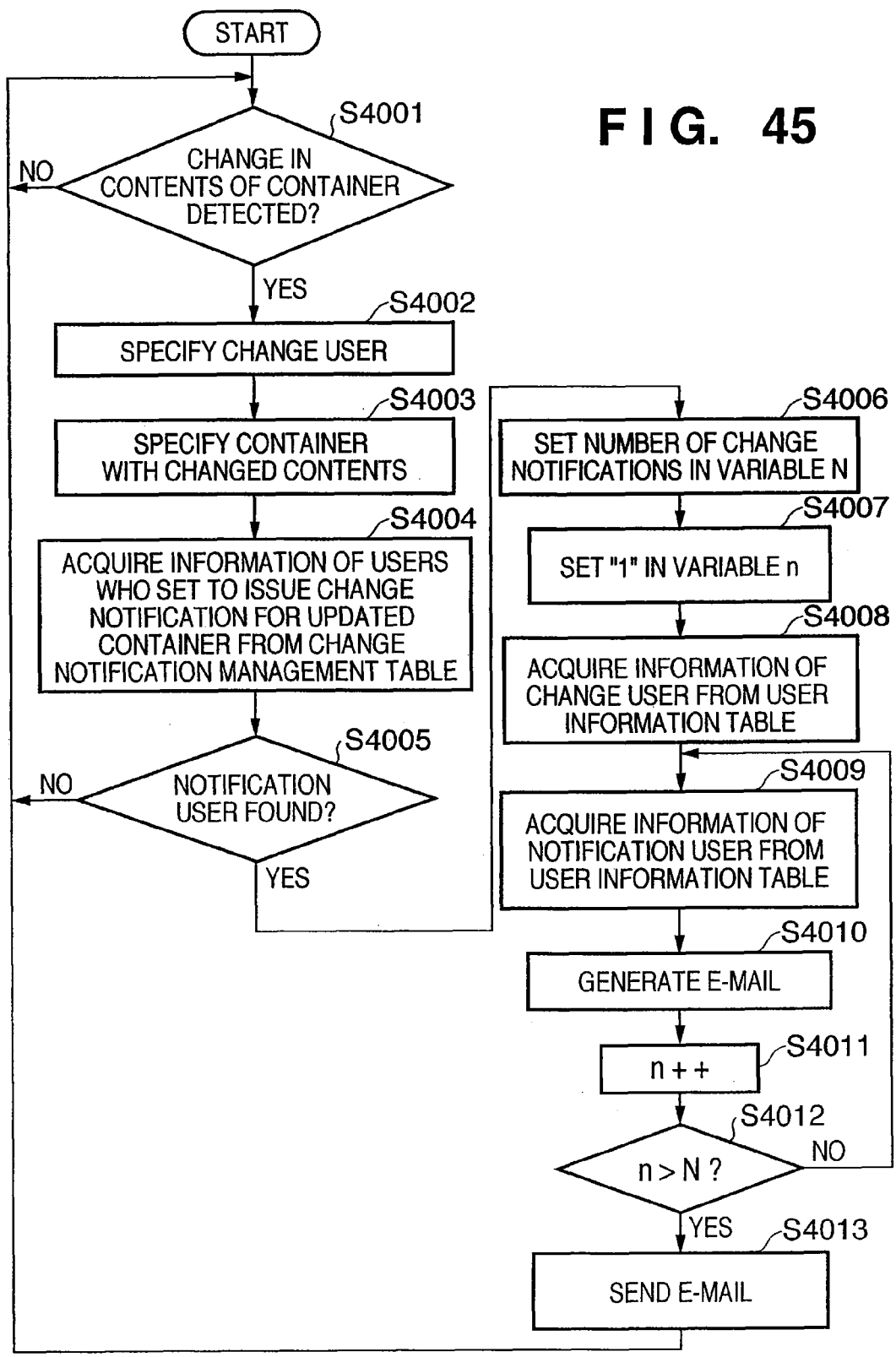
FIG. 45 is a flowchart showing the mail notification processing.

FIG. 45 is a flowchart showing the mail notification processing. The DB server 117 executes this processing.

As in the first embodiment, the following explanation will be given taking user Y shown in FIG. 22 as an example. User Y sets to issue a change notification when the contents of containers A, E, and G change (see FIG. 44). Assume that user X (change user) has changed the contents of containers B and E, resulting in the unread/read states shown in FIG. 39.

Upon detection of a change in contents of containers (S4001), the DB server 117 specifies a change user (S4002), and specifies containers whose contents have changed (S4003). The server 117 acquires information of users who set to issue a change notification in association with the updated containers from the change notification management table (S4004). The example of FIG. 44 includes user X for container B, and users Y and Z for container E.

Next, the DB server 117 if there are users to whom a change notification is to be issued upon change in contents of the containers (to be referred to as "notification user" hereinafter) (S4005). As for container B, since the change user is identical to a user who sets a change notification, the server 117 determines that a change notification is not required. As for container E, since the change user is different from users who set a change notification, users Y and Z are notification users. If no notification user is found, the process returns to step S4001.

The DB server 117 sets the number of change notifications ("2" in this case) in a variable N (S4006) and "1" in a variable n (S4007). The server 117 then acquires information of the change user from the user information table to specify the mail address of the change user (S4008). The server 117 acquires information of the notification user (e.g., user Y) from the user information table to specify the mail address of the notification user (S4009). The server 117 generates an e-mail message set with the mail address of the notification user as a destination, and that of the change user as a source (S4010). In this case, the server 117 may add a message "<doctor A> has changed the contents of <prescription> of a patent <patient name>" or the like to the title or body text of the e-mail message based on the information acquired from, e.g., the state change management table. Note that < . . . > may change depending on e-mail messages to be generated.

The DB server 117 increments the variable n by 1 (S4011) and checks the relation between the variables n and N (S4012). If n≤N, the process returns to step S4009 to acquire information of the next notification user (e.g., user Z). If n>N, the server 117 ends generation of e-mail messages, and sends the generated e-mail messages to a mail server (not shown) (S4013). After that, the process returns to step S4001.

In this way, when the contents of a container desired by the user have changed, a change notification is issued to that user by e-mail. Therefore, the user who wants to surely know that the contents of the container have been updated can detect the presence/absence of a change without accessing the server to display that container.

[Change to "Read" by E-Mail]

When the contents of a container set with a change notification have changed, that change is notified by e-mail. This e-mail message can describe the changed contents of that container as body text. As a result, the user who received the change notification can know the change contents at that time without opening, e.g., the electronic medical chart. After the user has known the change contents by the change notification, that container need not be displayed in a large size as an unread one when he or she opens the electronic medical chart. Hence, the user who received the change notification notifies the DB server 117 of the disposition of the mail message. Upon reception of the disposition notification, the DB server 117 changes the unread/read state of the container of the corresponding user to "read."

FIG. 46 shows an example of an ID information table used to specify the change notification. This ID information is described in the title or body text of an e-mail message of the change notification. The DB server 117 manages the sent e-mail message (change notification), the destination user, and the container, the change of which was notified, based on the ID information table stored in the DB 119.

Figure 47:
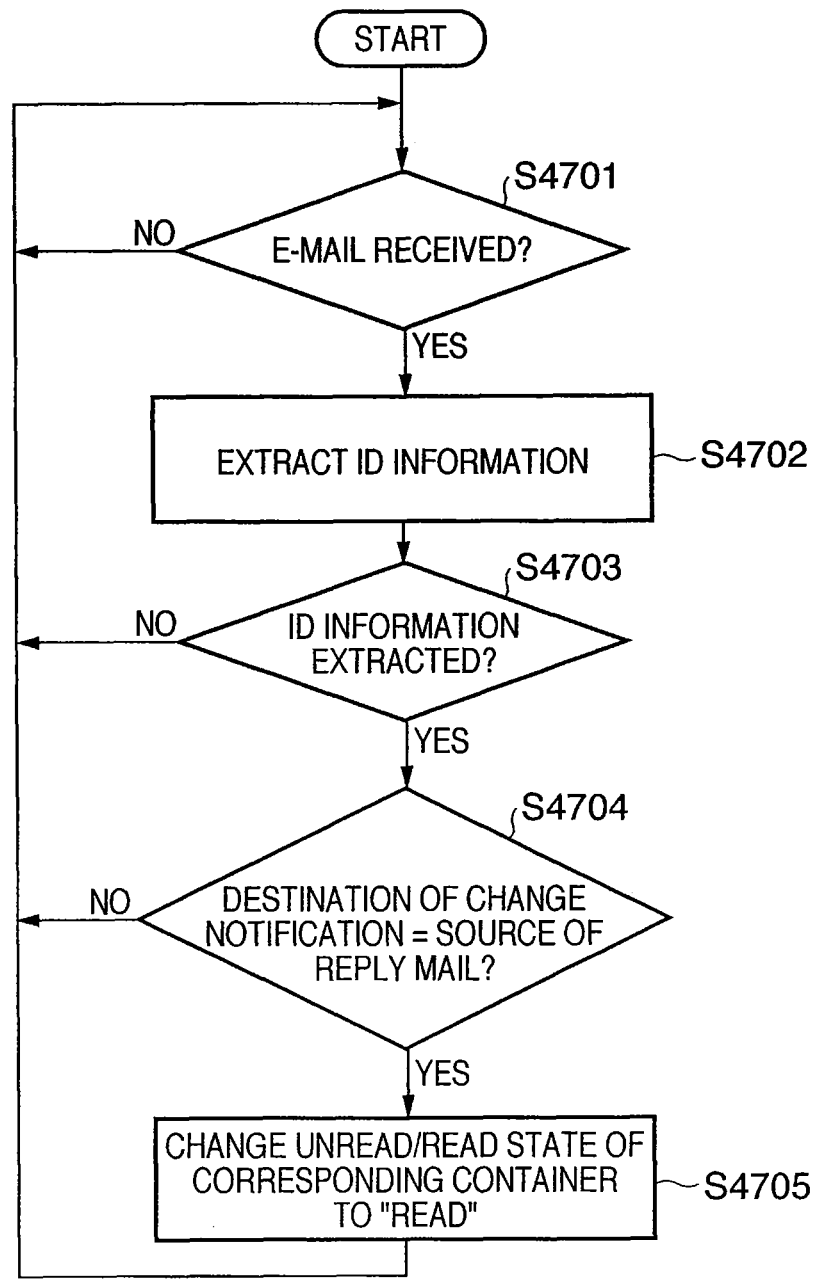
FIG. 47 is a flowchart for explaining processing for changing to "read" by means of an e-mail message.

FIG. 47 is a flowchart for explaining the processing for changing to "read" by e-mail. The DB server 117 executes this processing.

For example, after user Y disposes the change notification and confirms the change contents of container E, he or she replies by sending the e-mail message to the DB server 117. Upon reception of the e-mail message (S4701), the DB server 117 extracts ID information from the received e-mail message (S4702). In this case, the server 117 extracts M0001.

The DB server 117 checks if the ID information can be extracted (S4703). If the ID information cannot be extracted, the process returns to step S4701. On the other hand, if the ID information can be extracted, the server 117 compares the destination mail address of the change notification with the source mail address of the reply e-mail message (S4704). If the two mail addresses match, the server 117 determines that user Y has confirmed the change contents of container E, and changes the unread/read state of container E in the unread/read management table for user Y to "read" (S4705).

In this manner, when the DB server 117 confirms reception of a reply e-mail message to the change notification mail message, it changes the unread/read state of the container for the notification user to "read." As a result, the DB server 117 can appropriately notify the notification user of the change contents of the container without excessively presenting the container whose contents have changed. If the notification user does not send a reply e-mail message to the change notification mail message, the container is displayed in an unread state as per normal. Hence, when browsing of the change contents by means of the change notification is incomplete, the change contents can be notified by the display state of the container.

In the description of the above example, the unread/read state of the container is changed to "read" upon reception of the reply e-mail. Alternatively, the message disposition notification function may be used to determine that the change notification mail message is confirmed and to change the unread/read state to "read."

Also, the user may display, e.g., the electronic medical chart and the unread/read state may be changed to "read" before the disposition of the change notification. In this case, the DB server 117 deletes the record of the change notification which was sent when the unread/read state of the container of interest was changed to "unread" from the ID information management table. As a result, even when, e.g., the electronic medical chart is browsed before the disposition of the change notification, the ID information of an e-mail message to be received after the disposition of the change notification is not included in the ID information management table. Therefore, the DB server 117 executes no processing even if it receives that e-mail message.

Sixth Embodiment

Information processing according to the sixth embodiment of the present invention will be described below. Note that the same reference numerals in the sixth embodiment denote the same components as those in the first to fifth embodiments, and a detailed description thereof will be omitted.

The sixth embodiment will explain layout processing upon execution of printing in place of display.

Figure 48A:
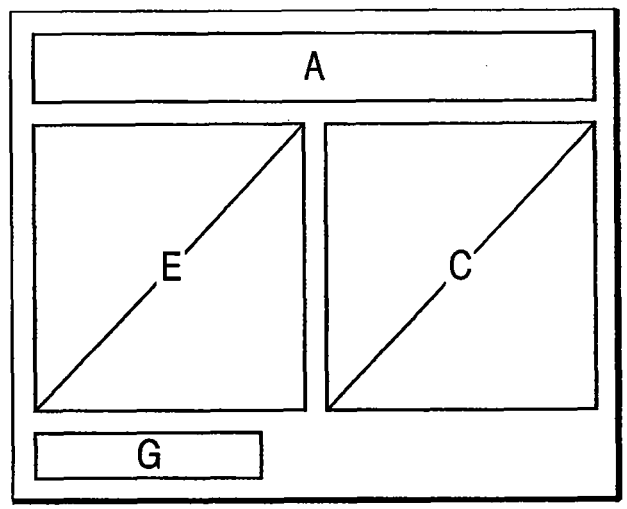
FIGS. 48A and 48B show an example of document templates for printing.
Figure 48B:
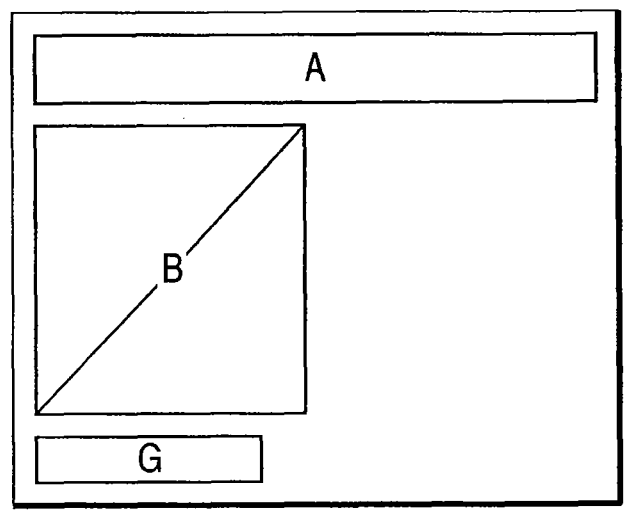

The DB server 117 or engine server 227 manages document templates for printing in addition to those for display. FIGS. 48A and 48B show an example of document templates for printing. On the templates for printing, containers that must be printed (containers A and G in FIGS. 48A and 48B) and containers to be printed when they are unread (containers B, C, and E in FIGS. 48A and 48B) are defined. The containers to be printed when they are unread are managed in a state wherein an oblique line is displayed inside each container.

As in the first embodiment, an application example of the layout system to the electronic medical chart will be explained below.

Assume that doctor A creates an electronic medical chart, nurse B browses it, and after that, doctor A makes changes of items B and E of that electronic medical chart (see FIG. 30). After that, assume that nurse B prints the electronic medical chart.

Figure 49:
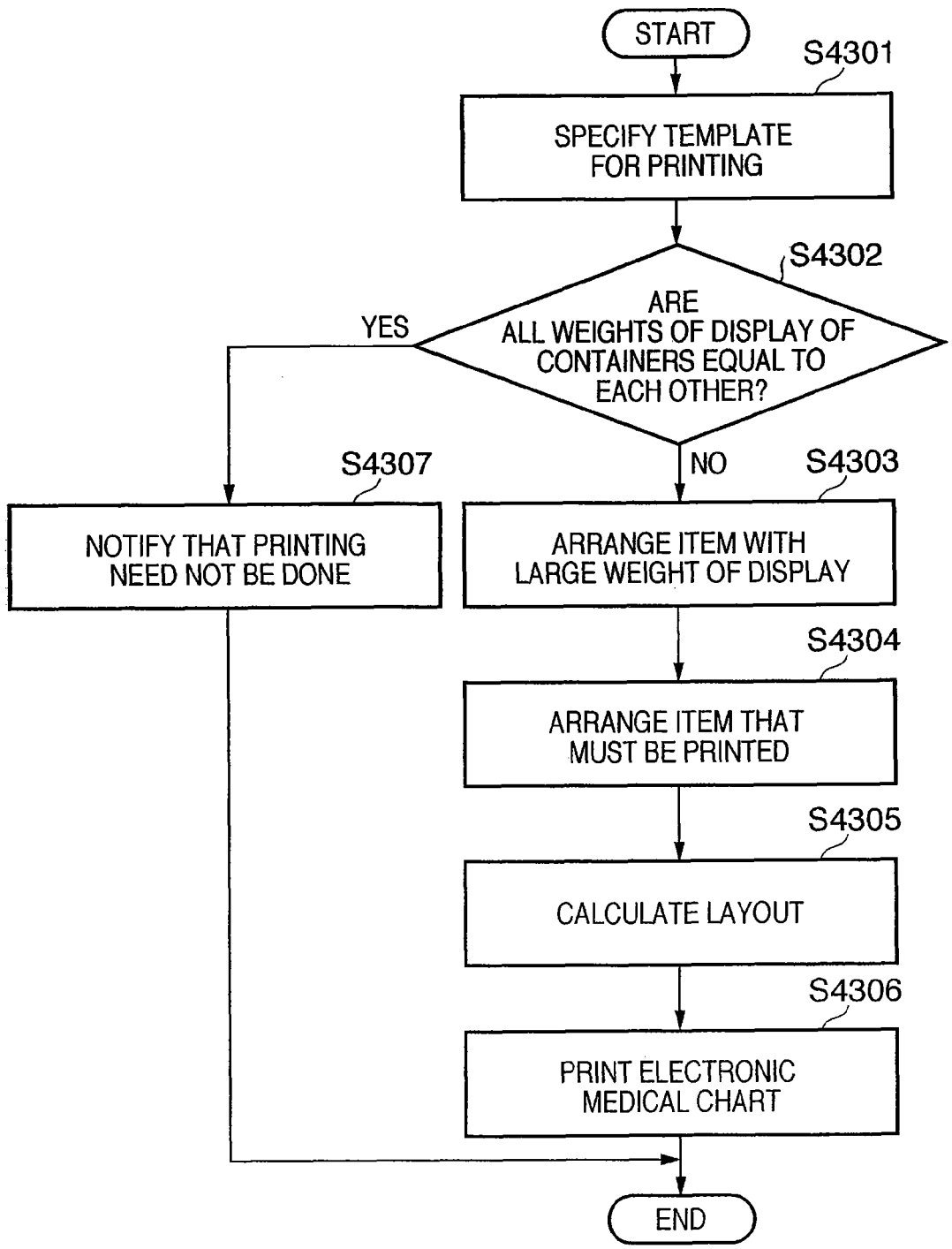
FIG. 49 is a flowchart showing the processing upon printing.

FIG. 49 is a flowchart showing a processing example upon printing. The layout edit application 121 executes this processing.

Upon reception of a print request of the electronic medical chart from nurse B, the layout edit application 121 specifies a template for printing (S4301), and checks if the weights of display of respective items are equal to each other (S4302). Since the unread/read states of items B and E for nurse B are "unread," the weights of display of items B and E are different from those of other items. Therefore, the process advances to step S4303. However, if the unread/read states of all the items are "read," the application 121 notifies the user who issued the print request that printing need not be made since there is no unread item (S4307), thus ending the processing.

If there are unread items, the layout edit application 121 arranges only items B and E with the weights "2" of display in accordance with the template for printing (S4303), and also arranges items A and G which must be printed (S4304). The application 121 inserts information to be printed in the containers and calculates the layout (S4305). The application 121 then prints the electronic medical chart (S4306), thus ending the processing.

In this way, upon printing, e.g., the electronic medical chart, items which are not required to print are controlled not to print unless their unread/read states are "unread." Hence, print data on which only required information is laid out can be generated and printed. As a result, a wasteful print amount can be reduced.

Also, unprinted/printed states indicating whether or not to print are managed using an unprinted/printed management table in addition to the unread/read states indicating whether or not to browse. In response to a print request, unprinted items may be considered as containers to print with reference to the unprinted/printed management table, thus executing print processing. In this case, other than items which must be printed, only items whose contents have been changed of those which were printed previously can be printed. As a result, if all the items of, e.g., the electronic medical chart are printed each time, the previously printed electronic medical chart must be discarded. However, since only items whose contents have been updated are printed, wasteful printed materials can be prevented from being discarded without discarding the previously printed electronic medical chart.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-144682, filed on May 24, 2006, which is hereby incorporated by reference herein in its entirety.

What is claimed is:

1. An information processing method, comprising the steps of:
    specifying a user from input user information, and specifying containers to be displayed from information of a document template corresponding to the specified user;
    storing, in a database, a table for each user to manage an unread/read state of each container;
    obtaining unread/read states of the specified containers referring the table for the specified user;
    arranging at least one unread container of the specified containers prior to at least one read container of the specified containers referring the obtained unread/read states so as to generate a digital document; and
    changing unread/read states managed by tables stored in the database,
    wherein in a case where the specified user changes a content inserted in the arranged container, an unread/read state of a container including the changed content is set to an unread state in the tables for users except the specified user, in the changing step.

2. The method according to claim 1, wherein in the changing step, the unread/read state is determined in accordance with a last browsing date and time of each the specified containers by the specified user and a last update date and time of each of the specified containers.

3. The method according to claim 1, further comprising the steps of:
    displaying the generated digital document; and
    re-arranging, in a case where an unread/read state of an unread container in the displayed digital document changes to a read state the specified containers.

4. The method according to claim 1, wherein in the changing step, an unread/read state of a container sets to a read state in response to browsing of the digital document by the specified user or a change instruction of the unread/read state of the unread container to the read state by the specified user.

5. The method according to claim 4, further comprising the steps of:
    identifying, in a case that the unread/read state of a container changes to the read state, a user who browsed the container of interest and a user who changed a content inserted in the container of interest; and
    notifying the identified user who changed the content that the unread/read state of the container is changed to the read state by the identified user who browsed the container.

6. The method according to claim 4, further comprising the steps of:
    identifying, in a case where the unread/read state of a container changes to an unread state, a user who changed a content inserted in the container of interest;
    selecting users to be notified based on management information of users who are to be notified that the unread/read state of a container changes to the unread state, and the identified user who changed the content; and
    notifying the selected users of a change of the content.

7. The method according to claim 6, wherein the notification includes contents of the changed content and specification information used to specify the notification.

8. The method according to claim 7, further comprising the steps of:
    receiving a reply, which includes the specification information, to the notification; and
    changing the unread/read state of a container for a user according to the specification information included in the reply to the read state.

9. The method according to claim 1, further comprising the step of managing an importance level of a content as an importance level of a container in which the content of interest is inserted for each role of the specified user,
    wherein in the arranging step, the specified containers are arranged in accordance with the unread/read states and the importance levels.

10. The method according to claim 1, further comprising the step of managing a change date and time of an unread/read state of a container, which changed to an unread state, for each user and record,
    wherein in the arranging step, the specified containers are arranged in accordance with a difference between the change date and time and a current date and time and the unread/read states.

11. The method according to claim 10, wherein in the arranging step, a container having a newer change to the unread state is preferentially arranged.

12. The method according to claim 1, further comprising the step of accepting a print request of the digital document from an arbitrary user, and generating print data of a document on which an unread container is arranged.

13. The method according to claim 1, further comprising the step of accepting a print request of the digital document from an arbitrary user, and generating print data of a document on which an unread container and a contents, which must be printed, are arranged.

14. An information processing apparatus, comprising:
    a specifying section, arranged to specify a user from input user information, and to specify containers to be displayed from information of a document template corresponding to the specified user;
    a memory which stores a database storing a table for each user to manage an unread/read state of each container;
    an obtaining section, arranged to obtain unread/read states of the specified containers referring the table for the specified user;
    an arranging section, arranged to arrange at least one unread container of the specified containers prior to at least one read container of the specified containers referring the obtained unread/read states so as to generate a digital document to be displayed on a monitor; and
    a changing section, arranged to change unread/read states managed by tables stored in the database,
    wherein in a case where the specified user changes a content inserted in the arranged container, the changing section sets an unread/read state of a container including the changed content to an unread state in the tables for users except the specified user, and wherein a CPU execute codes that serve as the specifying section, obtaining section, arranging section and changing section.

15. A computer-executable program stored on a non-transitory computer-readable medium comprising program code causing a computer to perform an information processing method, the method comprising the steps of:
   specifying a user from input user information, and specifying containers to be displayed from information of a document template corresponding to the specified user;
   storing, in a database, a table for each user to manage an unread/read state of each container;
   obtaining unread/read states of the specified containers referring the table for the specified user;
   arranging at least one unread container of the specified containers prior to at least one read container of the specified containers referring the obtained unread/read states so as to generate a digital document; and
   changing unread/read states managed by tables stored in the database,
   wherein in a case where the specified user changes a content inserted in the arranged container, an unread/read state of a container including the changed content is set to an unread state in the tables for users except the specified user, in the changing step.

16. A non-transitory computer-readable medium storing a computer-executable program causing a computer to perform an information processing method, the method comprising the steps of:
   specifying a user from input user information, and specifying containers to be displayed from information of a document template corresponding to the specified user;
   storing, in a database, a table for each user to manage an unread/read state of each container;
   obtaining unread/read states of the specified containers referring the table for the specified user;
   arranging at least one unread container of the specified containers prior to at least one read container of the specified containers referring the obtained unread/read states so as to generate a digital document; and
   changing unread/read states managed by tables stored in the database,
   wherein in a case where the specified user changes a content inserted in the arranged container, an unread/read state of a container including the changed content is set to an unread state in the tables for users except the specified user, in the changing step.

* * * * *